Figure 1:
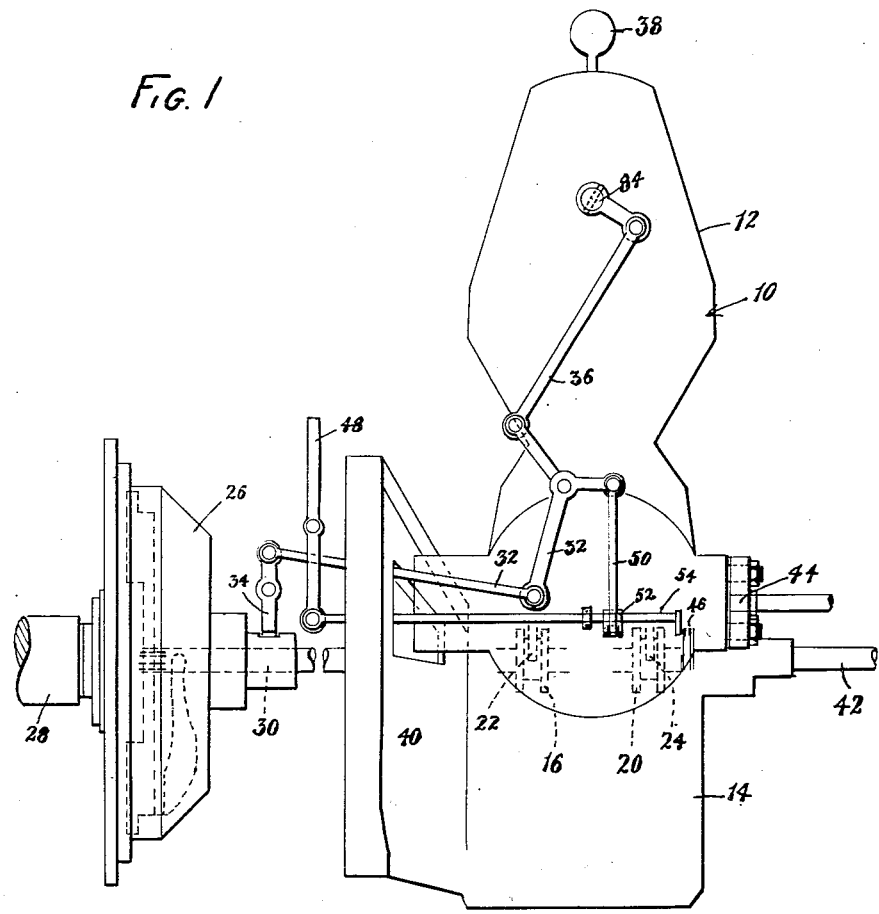

Robert L. Dykes
INVENTOR.

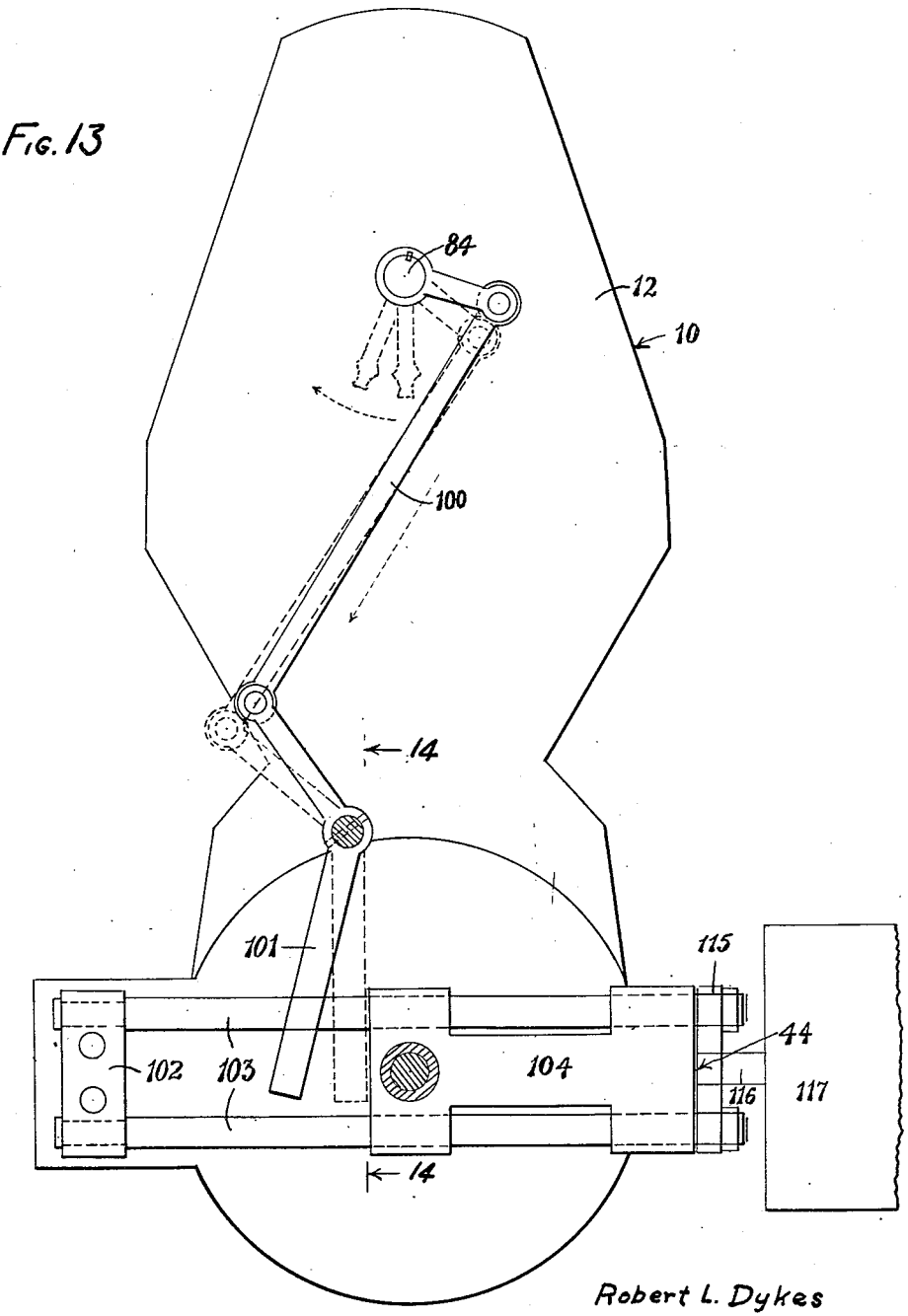

March 19, 1957

R. L. DYKES 2,785,779

GEAR SHIFTING MECHANISM

Filed Feb. 1, 1955.

15 Sheets-Sheet 7

Robert L. Dykes
INVENTOR.

BY James F. Weiler &
Jefferson D. Giller
ATTORNEYS

March 19, 1957 R. L. DYKES 2,785,779
GEAR SHIFTING MECHANISM
Filed Feb. 1, 1955 15 Sheets-Sheet 8
FIG. 47
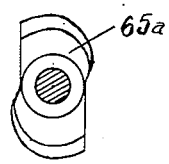
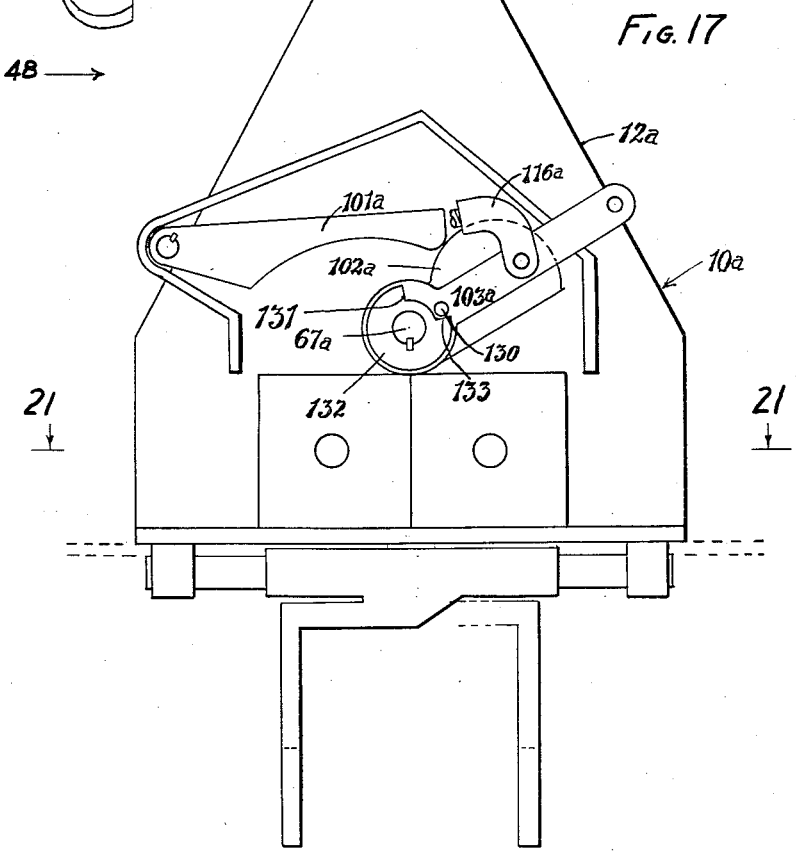
FIG. 17
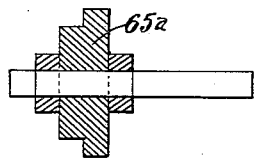
FIG. 48
Robert L. Dykes
INVENTOR.
BY
ATTORNEYS

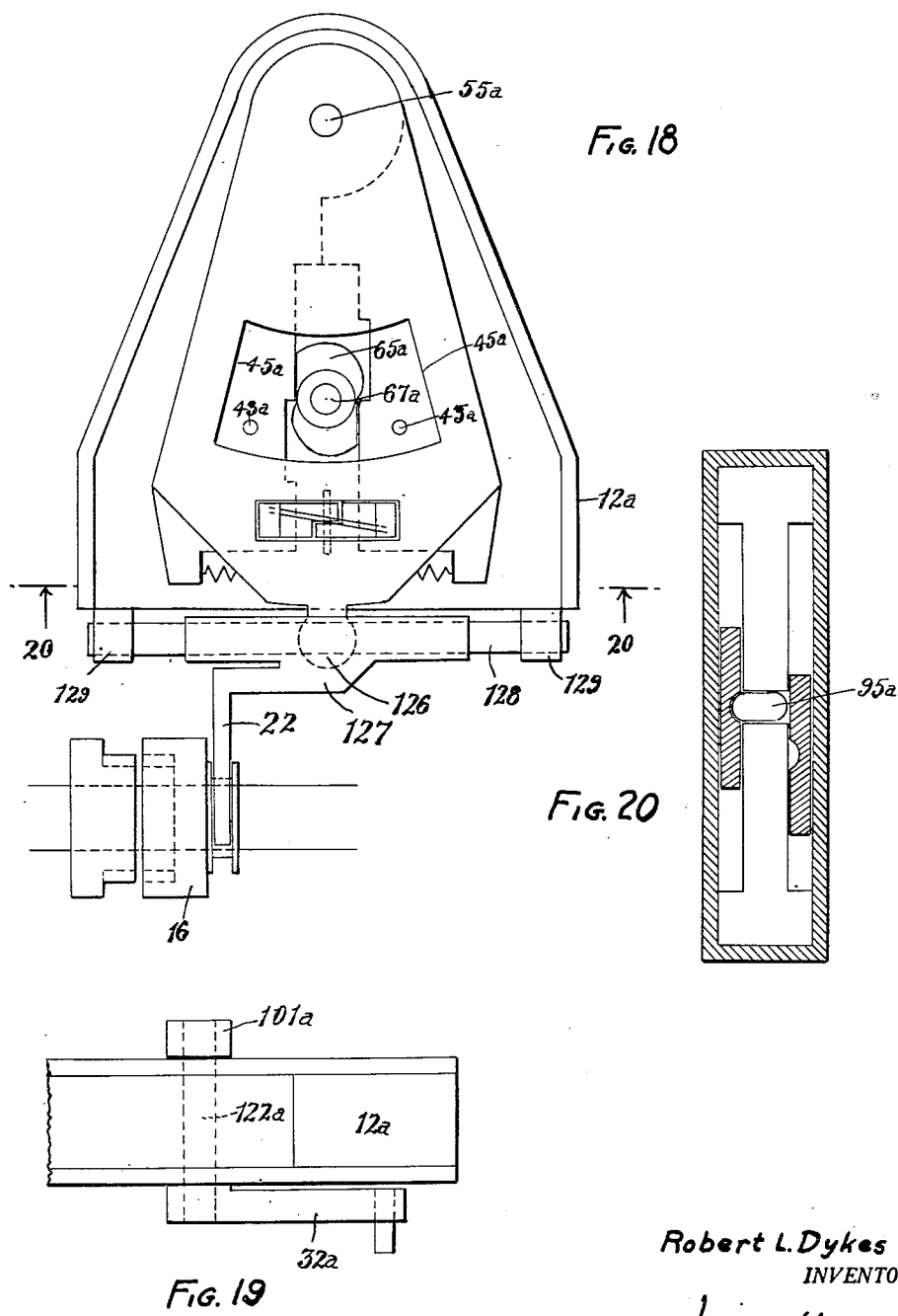

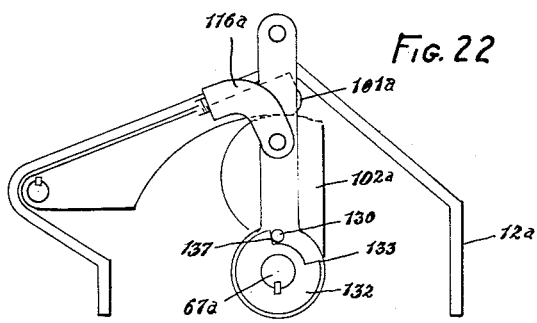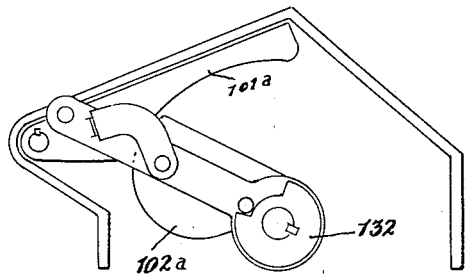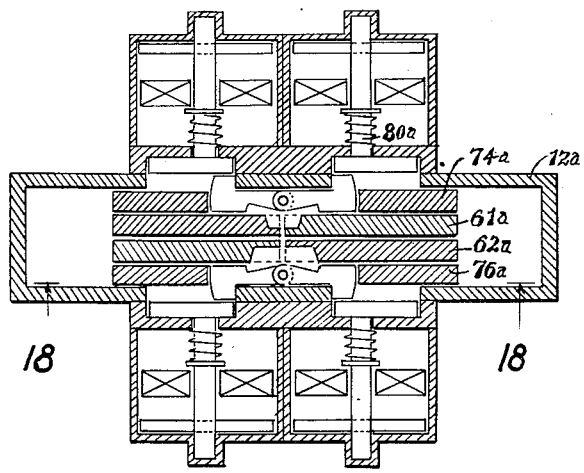

March 19, 1957 R. L. DYKES 2,785,779
GEAR SHIFTING MECHANISM
Filed Feb. 1, 1955 15 Sheets-Sheet 11

Robert L. Dykes
INVENTOR.

BY
ATTORNEYS

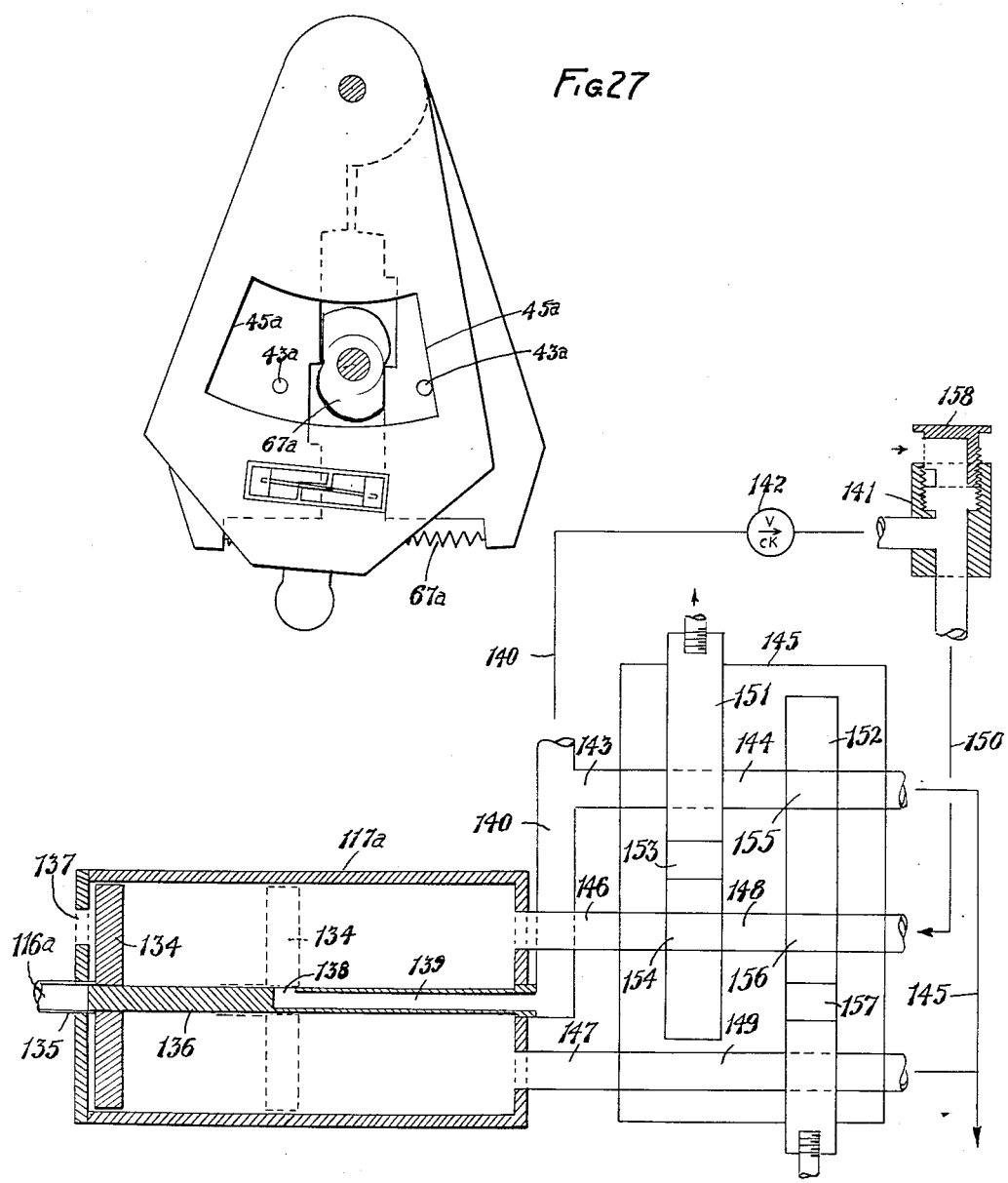

Robert L. Dykes
INVENTOR.

March 19, 1957 R. L. DYKES 2,785,779
GEAR SHIFTING MECHANISM
Filed Feb. 1, 1955 15 Sheets-Sheet 14

Robert L. Dykes
INVENTOR.

BY *James F. Wierer &*
*Jefferson D. Hiller*
ATTORNEYS

March 19, 1957     R. L. DYKES     2,785,779
GEAR SHIFTING MECHANISM

Filed Feb. 1, 1955     15 Sheets-Sheet 15

Robert L. Dykes
INVENTOR.

BY *James F. Wieler &*
*Jefferson D. Miller*
ATTORNEYS

United States Patent Office 2,785,779
Patented Mar. 19, 1957

2,785,779

GEAR SHIFTING MECHANISM

Robert L. Dykes, Noble, La., assignor of twenty-five percent to S. H. Parrott, Oil City, La.

Application February 1, 1955, Serial No. 485,391

13 Claims. (Cl. 192—.073)

The present invention relates to a gear shifting mechanism and, more particularly, relates to such a mechanism which may be operated both manually and automatically and which may be applied to automobiles, busses and trucks as well as other equipment, such as heavy equipment, earth moving equipment, oil field equipment such as drilling rigs and the like.

While the present invention may be applied to any variable speed control by gear assembly, for the purpose of disclosure, examples of the invention are given particularly with respect to trucks and automobiles. It will be understood, of course, that these are only typical applications and that other uses and adaptations will readily suggest themselves to those skilled in the art.

In general, and in particular with respect to trucks, in shifting gears considerable time is necessary by the shifting operation which results in a loss of momentum of the truck. This places a great strain on the gears, drive shaft, axles and universal joints and eventually crystallizes and causes them to break and contributes to a shorter life of the motor inasmuch as many times it is necessary to drive in a lower gear than in a higher gear as would be the case if the time required by the shifting operation were shortened. Also, in attempting to preserve the momentum of the truck or automobile, many operators shift rapidly and fail to perfectly engage the gears before releasing the clutch which in turn causes damage to the gears. In addition, particularly in trucks, the driver is subject to considerable fatigue in shifting conventional gear shifting devices and does not have the control desired. It would therefore be highly desirable to provide a gear shifting device in which the gear shifting mechanism and clutch are suitably synchronized in operation and in which a minimum of time is required in the shifting operation to conserve the momentum of the truck. It would also be highly advantageous to be able to preselect the gear before performing the shifting operation inasmuch as many times the operator is otherwise occupied at the time he would ordinarily shift gears, for example, when turning a corner or driving over a bad place in the road.

It is therefore a major object of the present invention to overcome the above-mentioned disadvantages of conventional gear shifting assemblies.

It is yet a further and important object of the present invention to provide a gear shifting mechanism in which the gear shifting elements and clutch are suitably synchronized and in which the gears may be preselected thereby leaving the operator free from selecting the gear at the particular time the shifting actually takes place.

It is yet a further object of the present invention to provide a gear shifting device of the character mentioned which considerably reduces the amount of time required in shifting from one gear to another thereby conserving the momentum of the particular vehicle or equipment to which the shifting device is applied.

A still further and important object of the present invention is the provision of a gear shifting device which reduces the amount of strain on the gears and which increases the life of the motor by making it possible to operate the motor in higher gears than is possible in certain conventional gear shifting mechanisms.

Yet a further object of the present invention is the provision of a gear shifting device of the character mentioned which is less fatiguing to the driver to operate and by which he exercises greater control and thereby provides safer operations than is possible with conventional gear shifting mechanisms.

Yet a further object of the present invention is the provision of a gear shifting mechanism of the character mentioned in which all gears can be changed by preselection of the gear selector lever and the shifting of the gears in accordance with the preselection is done automatically.

Yet a further object of the present invention is the provision of such a gear shifting mechanism which requires no special skill to operate, which is convenient for the handicapped, which is relatively inexpensive to manufacture, maintain and repair, which is of relatively simple construction not requiring special skill to service and repair, and which is economical and efficiently reliable to operate.

The gear shifting mechanism of the present invention is particularly adapted for completely automatic operation or for manual operation or a combination of both. For example, it would be highly desirable to provide a gear shifting mechanism which is automatic in operation but which might be manually operated as the occasion requires. This is particularly suited for use in passenger automobiles and small trucks although, of course, it can be applied to heavier trucks and busses as well as to other equipment or vehicles which will suggest themselves to those skilled in the art.

Accordingly, it is yet a further and important object of the present invention to provide a gear shifting mechanism of the character mentioned which is completely automatic or which may be automatic and subject to manual control at any time when desired.

Yet a further object of the present invention is the provision of such an automatic gear shifting mechanism which is more economical to manufacture, maintain and repair than other present automatic transmissions and which is of relatively simplified construction thereby providing relatively easy servicing and repair.

Still a further object of the present invention is the provision of a gear shifting mechanism of the character mentioned, either automatic or manual or a combination of both, in which remote control is easily provided and which can readily and easily be installed on any car, truck, bus or other equipment in which variable speed is controlled by gears.

Figure 2:
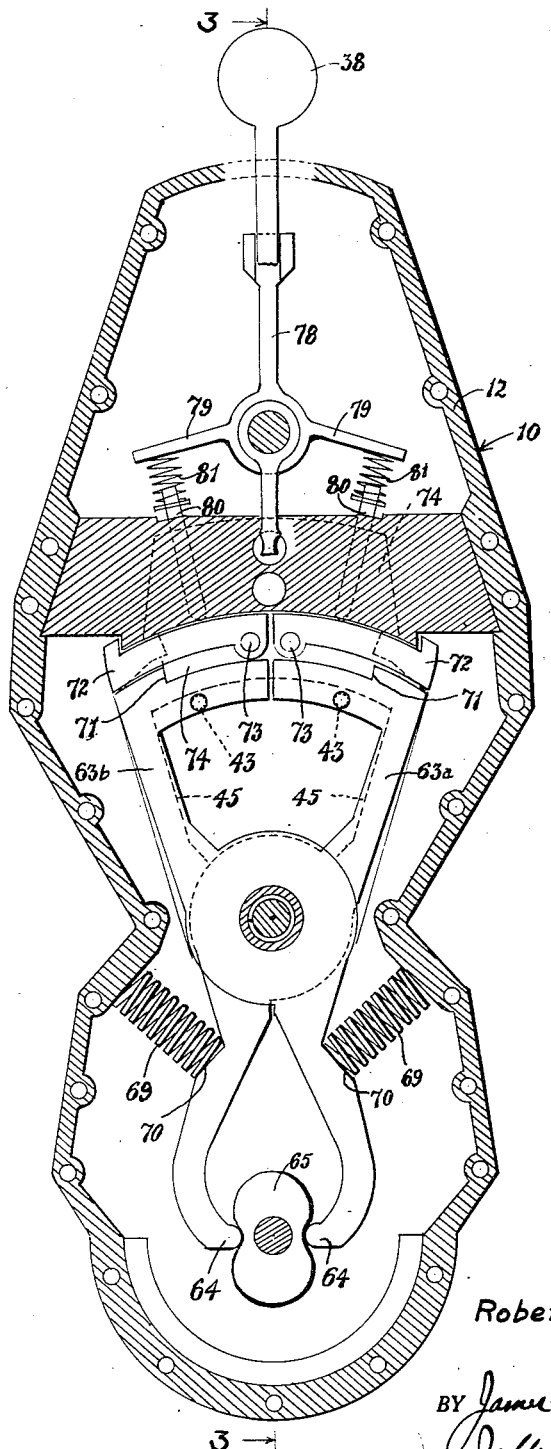
Figure 3:
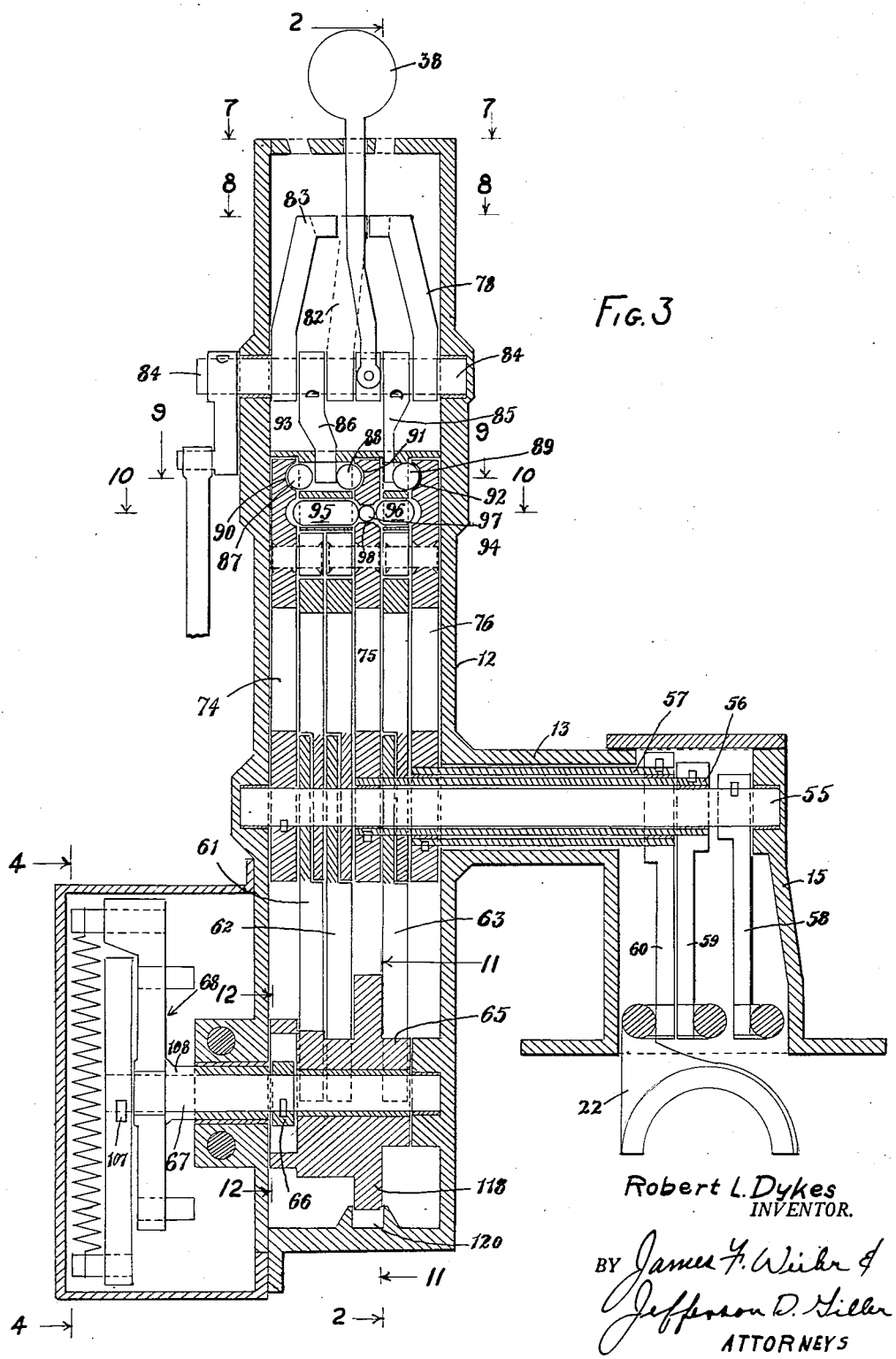
Figure 4:
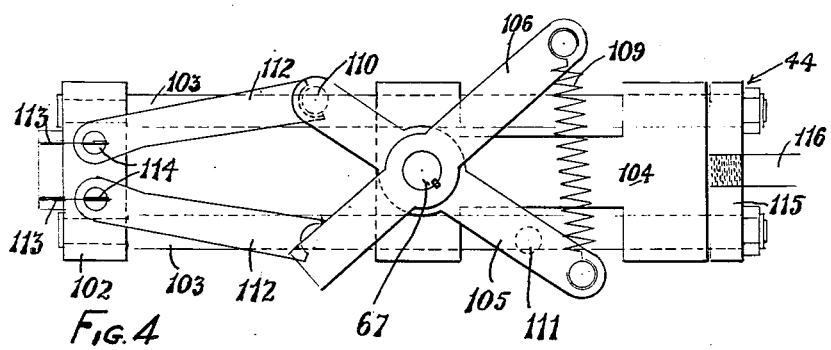
Figure 5:
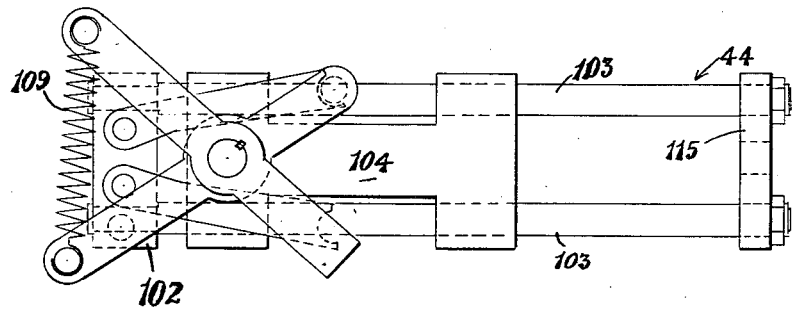
Figure 6:
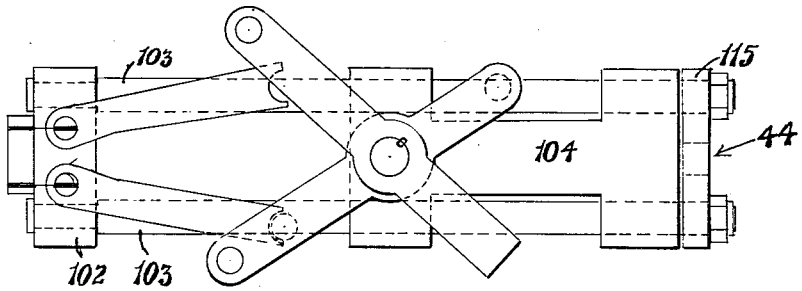
Figure 7:
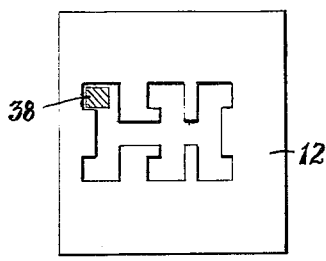
Figure 8:
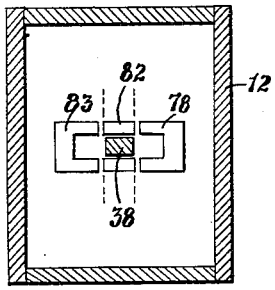
Figure 9:
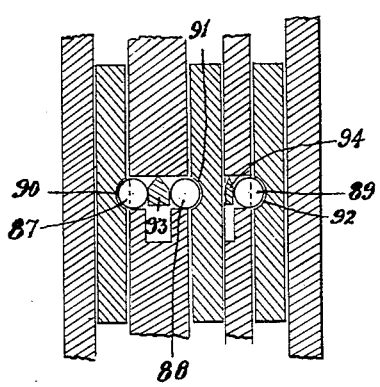
Figure 10:
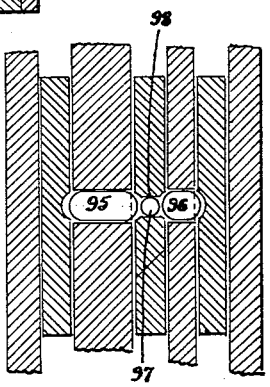
Figure 11:
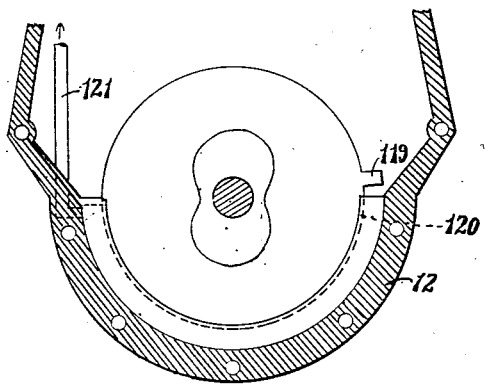
Figure 14:
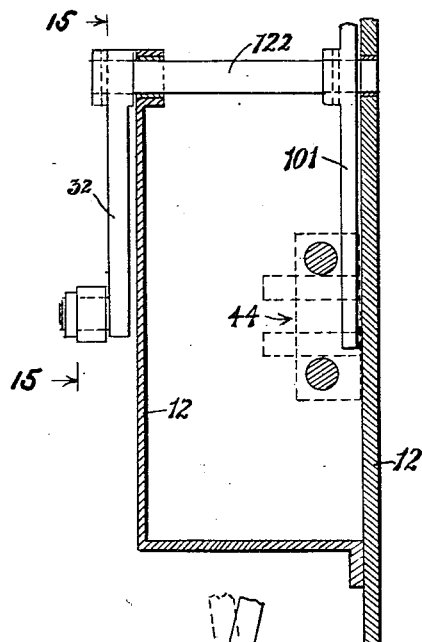
Figure 16:
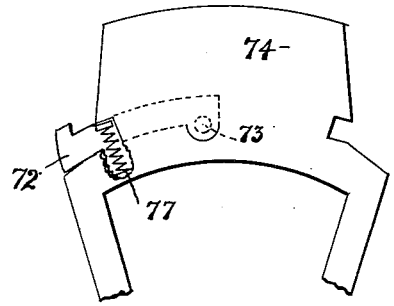
Figure 15:
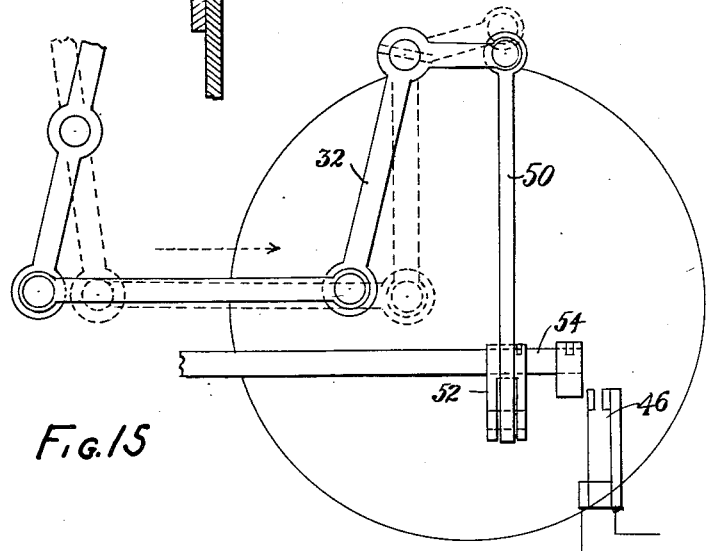
Figure 12:
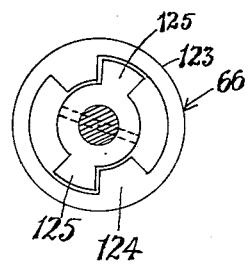
Figure 24:
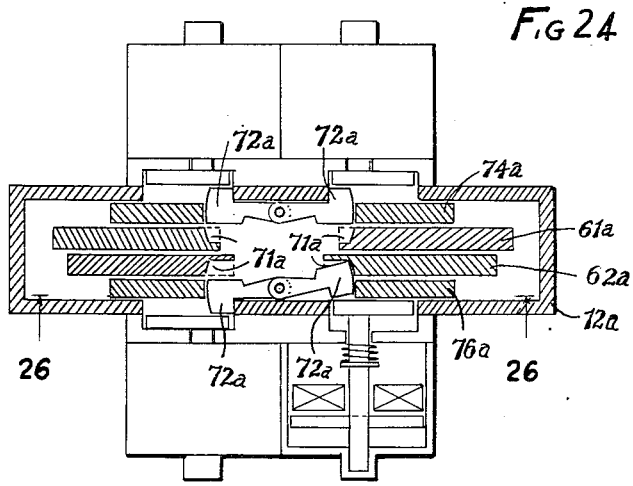
Figure 25:
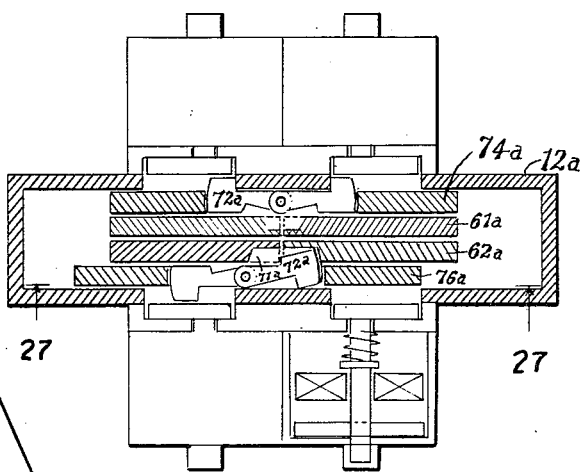
Figure 26:
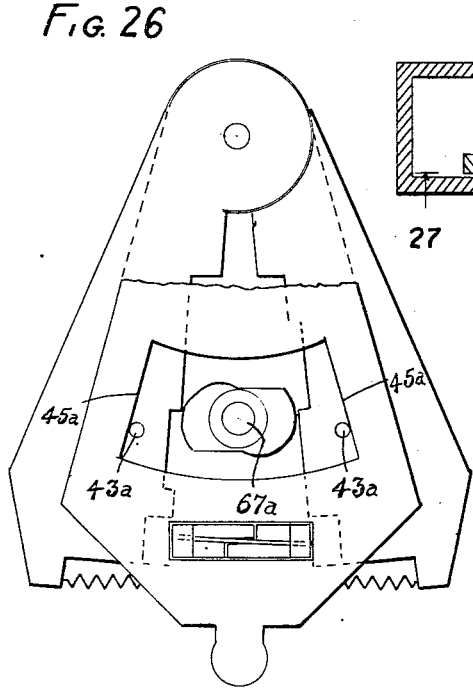
Figure 29:
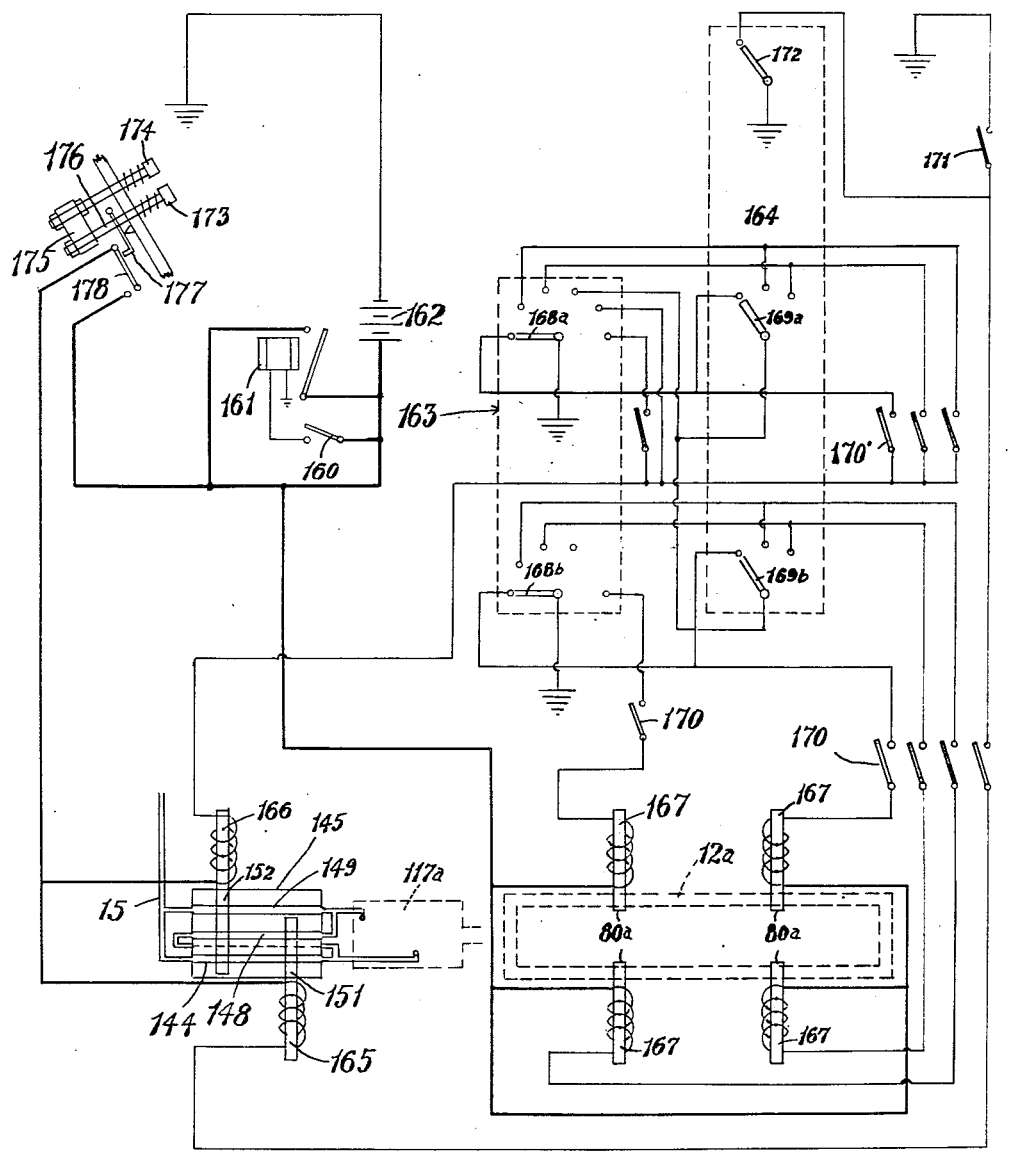
Figure 30:
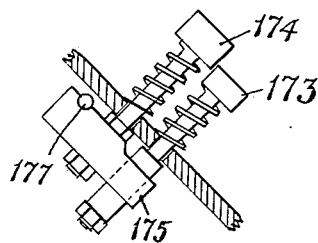
Figure 31:
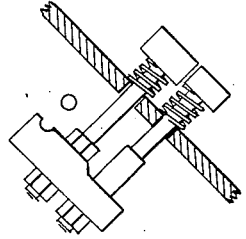
Figure 32:
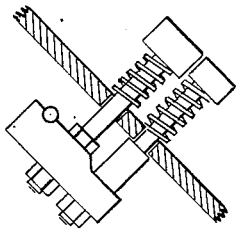
Figure 34:
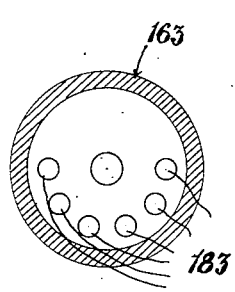
Figure 35:
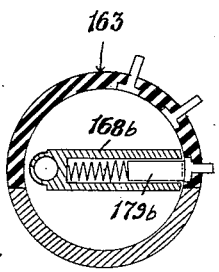
Figure 36:
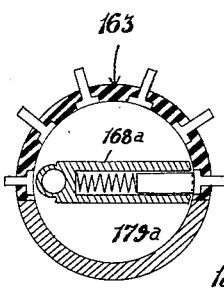
Figure 33:
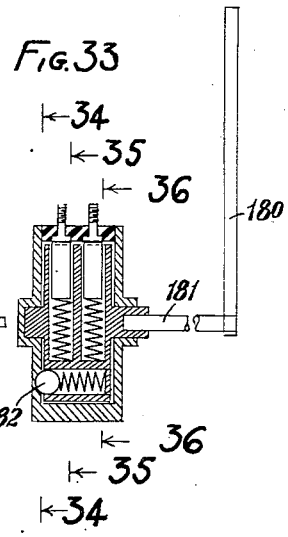
Figure 37:
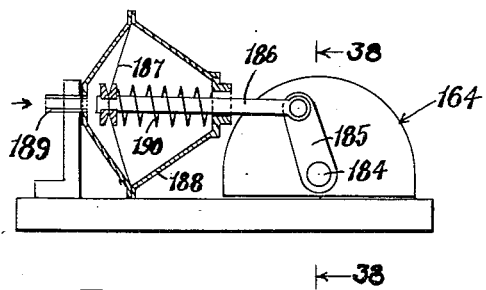
Figure 38:
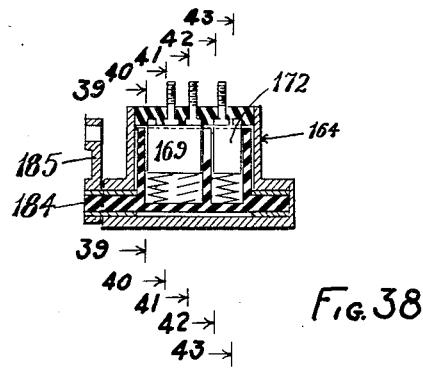
Figure 39:
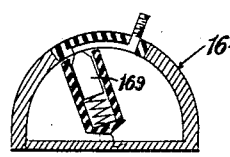
Figure 40:
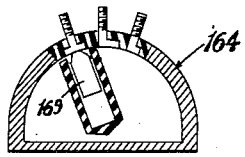
Figure 41:
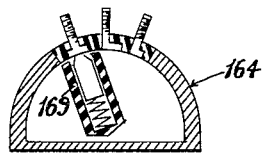
Figure 42:
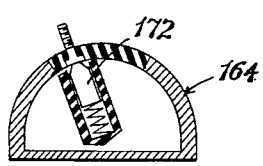
Figure 43:
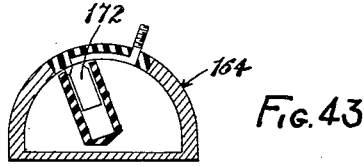
Figure 44:
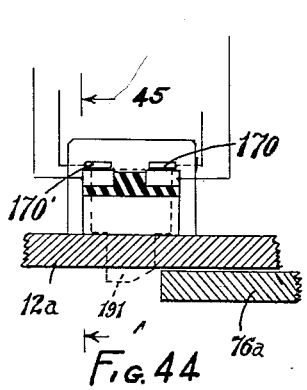
Figure 46:
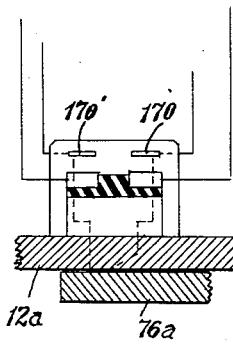
Figure 45:
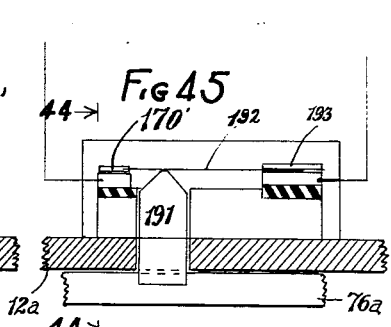

Other and further objects, advantages and features will be apparent as a description of presently preferred examples of the invention are given for the purpose of disclosure, taken in conjunction with the accompanying drawings, where like character references designate like parts throughout the several views, and where Figure 1 is a side elevation of a manual gear shifting mechanism according to the invention applied to a conventional truck transmission, Figure 2 is a cross-sectional view taken along the line 2—2 of Figure 3 illustrating elevation, in section, viewed from the back, of the gear shifting mechanism of Figure 1, Figure 3 is a sectional elevational view taken along the line 3—3 of Figure 2, Figure 4 is a sectional elevational view taken along the line 4—4 of Figure 3 and illustrates the gear shifting actuator mechanism, Figure 5 is a view similar to that of Figure 4 but illustrates the actuator in an intermediate position of its stroke, Figure 6 is a view similar to that of Figures 4 and 5 but illustrates the actuator at the other end of the stroke, Figure 7 is a cross-sectional view taken along the line 7—7 of Figure 3 and illustrates what may be termed a modified H-lock mechanism for the gear selector lever, Figure 8 is a cross-sectional view taken along the line 8—8 of Figure 3 and illustrates the upper ends of the gear selector arms, Figure 9 is a cross-sectional view taken along the line 9—9 of Figure 3 and illustrates a locking assembly for locking the gears in position, Figure 10 is a cross-sectional view taken along the line 10—10 of Figure 3 and illustrates a safety mechanism for preventing accidental engagement of more than one gear at a time, Figure 11 is a fragmentary, side sectional view taken along the line 11—11 of Figure 3 and illustrates an oil pump for lubricating the gear shifting mechanism, Figure 12 is a fragmentary, cross-sectional view taken along the line 12—12 of Figure 3 and illustrates a lost motion connection, Figure 13 is a view similar to that of Figure 1 and illustrates movement of the linkage controlling the locking mechanism illustrated in Figure 9, Figure 14 is a fragmentary, cross-sectional view taken along the line 14—14 of Figure 13 and illustrates linkage for actuating the clutch, Figure 15 is a fragmentary elevation view taken along the line 15—15 of Figure 14 and better illustrates the clutch actuating linkage and the control switch for actuating the gear shifters and releasing the clutch, Figure 16 is a fragmentary, side elevation better illustrating the springs for releasing the dogs when shifting to a neutral position, Figure 17 is an example of an automatic gear shifting mechanism according to the invention and is a plan view thereof, and illustrates a clutch actuating mechanism therefor, Figure 18 is a view similar to that of Figure 17 and is a sectional elevation view taken along the line 18—18 of Figure 21 with the top of the gear shifting assembly case removed, Figure 19 is a fragmentary view illustrating clutch actuation linkage connected to the clutch actuating cam arm, Figure 20 is a cross-sectional view taken along the line 20—20 of Figure 18 and illustrates means for preventing more than one gear shifter from engaging two gears at the same time, Figure 21 is a cross-sectional view taken along the line 21—21 of Figure 17 and illustrates the gear shifting mechanism in neutral position, Figure 22 is a fragmentary view of the clutch actuating cam and cam arm and illustrates the clutch in disengaged position, Figure 23 is a view similar to that of Figure 22 but illustrates the clutch actuating cam and cam arm when the gear shifting mechanism is in fully cocked position, Figure 24 is a view similar to that of Figure 21 and illustrates the gear shifting mechanism in a cocked position preparatory to shifting the gears, Figure 25 is a view similar to that of Figures 21 and 24 and illustrates the gear shifting mechanism after a gear shifting operation has been completed, Figure 26 is a fragmentary, sectional elevational view taken along the line 26—26 of Figure 24 and illustrates the gear shifting plates and shifters similar to that illustrated in Figure 18 but illustrating them in a cocked position rather than a neutral position, Figure 27 is a fragmentary, sectional elevation taken along the line 27—27 of Figure 25 and is a view similar to that of Figures 18 and 26 but illustrates the gear shifting plates and shifters in position after the gear shifting operation has been completed, Figure 28 is a fragmentary view, partly in section, illustrating a vacuum valve, vacuum cylinder and a schematic control therefor for actuating the clutch and gear shifting device, Figure 29 is a wiring diagram of a presently preferred electrical system for automatic or semi-automatic control of the gear shifting assembly, Figure 30 is a fragmentary view, in side elevation and partly in section, illustrating a shift control with the contact of the movable element of the shift control switch in "on" position, Figure 31 is a view similar to that of Figure 30 but illustrates the movable element of the shift control switch in "off" position with the throttle open, Figure 32 is a view similar to that of Figures 30 and 31 and illustrates the movable element of the shift control switch in "off" position but with the throttle closed, Figure 33 is a side view, in section, illustrating the manually-controlled selector and control switch, Figures 34, 35 and 36 are cross-sectional views taken along the lines 34—34, 35—35 and 36—36, respectively, of Figure 33, Figure 37 is a side view, partly in section, of the automatic selector switch and power means for actuating the same, Figure 38 is a cross-sectional view taken along the line 38—38 of Figure 37, Figure 39 is a cross-sectional view taken along the line 39—39 of Figure 38 and illustrates the contact for controlling the automatic switch, Figure 40 is a cross-sectional view taken along the line 40—40 of Figure 38 and illustrates the contacts for controlling the automatic gear shifting selectors, Figure 41 is a cross-sectional view taken along the line 41—41 of Figure 38 and illustrates the contacts for automatically controlling the vacuum valve, Figure 42 is a cross-sectional view taken along the line 42—42 of Figure 38 and illustrates the contact for controlling the automatic clutch operating vacuum valve, Figure 43 is a cross-sectional view taken along the line 43—43 of Figure 38 and illustrates the automatic clutch controlling switch, Figure 44 is a plan view, partly in section, illustrating a circuit breaker switch for opening a particular circuit so that when the control and accelerator are released it does not disengage the gear and re-engage the gear when the accelerator and control are actuated, such as by pressing the throttle, Figure 45 is a cross-sectional view taken along the line 45—45 of Figure 44, Figure 46 is a view similar to that of Figure 44 but shows the contacts broken or in open position, Figure 47 illustrates the cam for actuating the gear shifters, and Figure 48 is a cross-sectional view taken along the line 48—48 of Figure 47.

Before referring to the drawings, in general, the manually actuated gear shift assembly broadly includes an actuator which actuates a plurality of gear shifters which move gear plates connected thereto. Dogs are provided which are selectively actuated by the gear shift lever so that the preselected gear shift plate, and accordingly, gear, is held in position as the actuator completes its stroke thereby shifting the gear. Means are provided to prevent more than one gear from being engaged at a time and means are also provided to releasably lock the gears in position.

The actuator also operates the clutch at the same time or synchronizes it with the shifting of the gear plates and hence the gears.

In the modification of Figure 1, the gear shifters are connected to and move coaxially aligned gear shafts which move fingers which engage and move the gears into and out of engagement which is particularly suited for heavy duty, such as trucks and the like.

Referring now to the manually-actuated gear shifting assembly particularly as illustrated in Figures 1–16, and turning now to Figure 1, the gear shifting assembly is generally designated by the reference numeral 10 and includes the housing 12 the assembly being placed on and supported by the case 14 of the truck transmission. For the purpose of illustration a pair of movable gears 16 and 20 are illustrated and the fingers 22 and 24 are shown engaging these gears, in the usual manner, for moving them into and out of engagement with their mating gears.

A conventional clutch, generally designated by the reference numeral 26, is illustrated which is connected to the crankshaft 28 and driven shaft 30 in the usual manner. No detailed discussion is deemed necessary of these conventional elements as the gear shifting assembly of the present invention may be applied to any conventional transmission system.

Suitable clutch linkage, such as indicated at 32, is connected to the upstanding clutch throwout lever 34 which engages and disengages the clutch of the particular automobile, truck or bus to which it is applied. The upper portion of the linkage, such as indicated at 36, is for the purpose of operating the gear locking mechanism, as will be apparent later. The upper portion of the gear selector lever 38 is also illustrated in Figure 1 and its particular function and movement is described later herein.

The usual conventional frame members, such as indicated at 40, of the truck are illustrated as is a fragmentary portion of the driven shaft 42 of the transmission as well as the power assembly 44 for actuating the actuator or rocker assembly.

A control switch 46 is provided which controls the source of power 44 for shifting the gears, which switch is actuated by the foot lever 48, which may conveniently be actuated by the foot of the driver, although it may be actuated by a button or other means as desired.

Means are provided to release the source of power and this may take the form of the arm 50 connected to the rocker assembly 52, which in turn is connected to the contact arm 54 of the switch 46 so that the circuit may be broken or opened so that the power means 44 may be returned to its initial position and thereby reengaging the clutch, as will be more fully described later.

Referring now to Figures 2 and 3 a plurality of coaxially disposed gear shifter shafts 55, 56 and 57 are rotatably journaled in the housing 12, the free extremities of which are keyed or otherwise rigidly connected to the gear shifting arms 58, 59 and 60, respectively, which in turn are connected to and actuate the gear shifting fingers, such as 22, the other gear shifting fingers being behind this one and not readily seen in this view. Thus, as the gear shafts 55, 56 and 57 are rotated they in turn rotate the gear arms 58, 59 and 60 which in turn move the gear fingers to which they are connected thereby causing engagement or disengagement of the respective gears which they actuate.

The housing 12 is provided with an extension or projection 13 to enclose the gear shafts and a downwardly-projecting housing 15 is provided at the free extremity thereof which rests on and is supported by the transmission. If desired, the housing 15 connected to the projection 13 can provide the support for the entire assembly as it may be bolted or otherwise secured to the top of the transmission case, as best seen in Figure 1. These various elements, of course, may be connected or secured together or integrally formed in any preferred manner.

A plurality of gear shifters, that is, one gear shifter for each gear shaft is provided in the housing 12 and these are rotatably secured about the gear shafts 55, 56 and 57 and are designated by the reference numerals 61, 62 and 63, respectively. These gear shifters are in effect, formed of two pieces which are longitudinally split, as best seen in Figure 2, and which might be designated as 63a and 63b so that they have the ability to expand at each end as they are actuated.

The lower end of each gear shifters, and while reference is being made only to gear shifter 63, it will be understood that this applies to all the other gear shifters, have the inwardly turned ends 64 which are, in effect, cam followers which follow and are actuated by the cam 65 which is rigidly connected to a lost motion coupling 66 connected to the shaft 67 of the actuating rocker assembly, generally indicated by the reference numeral 68. Thus, as the cam 65 is rotated and half way through the stroke the cam followers or inwardly turned fingers 64 will be extended and, accordingly, the upper end of the gear shifter will similarly or accordingly be extended. When the cam has rotated 180° the gear shifter 63 will be in the position illustrated in Figure 2 again. It is noted that the gear shifters are yieldingly held in what might be termed a retracted position by means of the springs 69 engaging the shoulders 70 on the gear shifter 63. Thus, the cam followers or inwardly turned fingers 64 resiliently and snugly follow the cam 65 throughout its rotation.

The upper ends of the gear shifters, as illustrated by gear shifter 63, are provided with the upstanding stop shoulders 71 which are engaged by the dogs 72 pivoted, as at 73, to the gear shift plates 74, 75 and 76, the latter being rigidly connected to the gear shafts 55, 56 and 57, respectively. Thus, when the upper end of the gear shifter 63 is expanded a selected dog 72, as will be explained later, drops into the notch provided by the stop shoulder 71 and since that particular dog is connected to a gear shifter plate which in turn is rigidly connected to a particular gear shaft, when the gear shifter returns to its retracted position as illustrated in Figure 2, this will cause a movement of the gear shift plate thereby causing a movement of the particular gear shaft to which it is connected, the gear arm connected to the gear shaft and the gear finger actuated by the gear arm thereby actuating the particularly desired gear.

As best seen in Figure 16 the dogs 72 are spring pressed, such as by the spring 77, to prevent them from inadvertently dropping into the notches formed by the upstanding shoulders 71 on the gear selectors unless the force of this spring is overcome by preselection which will be described later herein. Thus, unless a particular gear is selected which, in effect, means that the force of the spring 77 on that particular dog 72 is to be overcome, the dog 72 will not drop into the notch formed by the upstanding shoulder 71 and will thereby permit the gear selector 63 to be expanded and contracted without effecting any shift of gears for that particular gear and gear linkage.

In order to make a selection of a particular gear to be shifted and, as mentioned previously, this is done by preselection by means of the upstanding gear selector lever 38. Turning to Figure 2, gear selector lever 38 engages a plurality of gear selector arms 78 which have the generally laterally extending arms 79 which actuate the plungers 80 by means of the springs 81. Thus, upon engagement of the gear selector lever 38 of one of the selector arms 78 movement of the former in either direction, that is generally transversely as the drawing is viewed, causes a generally downward movement of the particular plunger 80 which forces the particular dog 72 downwardly into the notch formed by the upstanding shoulder 71 of the particular gear selector. This engagement, of course, causes a movement of that particular gear plate as previously described.

As best seen in Figure 2 what might be termed return to neutral pins 43 are provided on each of the gear shifters, such as 63a, and which engage the inner sides 45 of the gear shift legs 63a and 63b so that when the gear shift legs 63a and 63b are in expanded position these pins 43 will engage the sides 45 and they will be moved into a neutral position. Thus, upon each rotation of the cam 65 through 180° thereby expanding the shifters each gear plate is moved back into a neutral position by the pins 43 engaging one of the sides 45 of the particular gear plate which previously has been in an engaged gear position. This particular structure and function will be better brought out and indicated in connection with the embodiment to be described later.

As best seen in Figures 3 and 8 a gear selector arm or assembly 83 is provided for each particular gear plate. Thus, upon engagement of that particular gear selector assembly and by moving the gear selector lever 38 in that portion of what might be termed the H, see Figure 7, the desired gear selection may be made.

As best seen in Figure 3 and in Figure 9, a locking means is provided which prevents movement of the gear plates except during the shifting operation. To this end each of the engageable selector arm assemblies 78, 82 and 83 are rotatably secured to the shaft 84 journaled in the housing 12, to which shaft is rigidly attached the depending arms 85 and 86. The lower portions of the depending arms 85 and 86 extend downwardly below the upper portions of the plates 74, 75 and 76 and coact with the balls 87, 88 and 89 which are provided in the recesses 90, 91 and 92 of the gear shifting plates 74, 75 and 76, respectively. As best seen in Figure 9 the cross members 93 and 94 are provided which are rigidly secured to the housing 12 and which have coacting recesses into which the balls 87, 88 and 89 are received. Thus, there is, in effect, a locking means permitting movement of the gear plates, and hence the gears, only during the shifting operation. While a plurality of cross or transverse members 93 and 94 may be provided, obviously, this may be a single member which is suitably slotted to receive the upper portions of the various gear plates as well as other elements.

As best seen in Figure 3 and also shown in Figure 10, a safety device is provided to prevent shifting of more than one gear at a time and, to this end, the cross members 93 and 94, or a single slotted cross member, if desired, extends downwardly and is provided with openings therein to receive the cylindrical rods 95 and 96 which engage and move the ball 97 disposed in the recess 98 in the gear plate 75. Thus, movement of any one gear plate causes a shifting of the cylindrical rods 95 and 96 and ball 97 thereby preventing any other gear plate from moving independently of the remainder. Of course, any desired safety or detent device for this purpose may be used as desired.

Referring now to Figure 13, the shaft 84 is keyed or otherwise rigidly secured to the crank arm assembly 100 which has its free extremity 101 depending downwardly and which is engaged by the slide 102 rigidly connected to and supported by the slide arms 103, the latter being slidingly received by the slide bracket 104. The motivating power or source of power is connected to the slide arms 103 thereby causing them to slide back and forth through the slide bracket 104. Thus, sliding of the slide assembly composed of the members 102 and 103 causes an engagement of the transverse slide member 102 with the free extremity 101 of the crank assembly 100 thereby rotating the shaft 84 which in turn rotates the fingers 85 and 86, see Figure 3, rigidly secured thereto thereby permitting the balls 87, 88 and 89 to move out of the recesses of their respective gear shift plates so that the gear shifting operation may take place. Once, however, the slide is moved back into the position illustrated in Figure 13, the arms 85 and 86 will be moved back into the position illustrated in Figure 3 and, accordingly, the balls 87, 88 and 89 will be moved back into their recesses thereby locking the gear shift in place in position after the shifting operation has been performed.

In order to actuate the cam 65, as seen in Figure 2, a spring loaded rocker mechanism is provided in connection with the slide assembly which is best illustrated in Figures 4-6, inclusive. Turning now to these figures a pair of rocker arms 105 and 106 are connected to the shaft 67, one of the arms being rigidly connected thereto by means of the key 107, and the other being rotatably connected thereto by means of the sleeve 108 as best seen in Figure 3. The spring 109, as best seen in Figures 4 and 5 is connected to free extremities of the arms 105 and 106 and bias the two arms toward one another at all times. The other end of one of the arms has a pin 110 at its free extremity and has a second pin 111 the same radial distance from the shaft 67 for the purpose of engaging the recessed ends of the actuator arms 112 which are yieldingly maintained in the position illustrated in Figure 4 by means of the leaf springs 113, the arms 112 being pivotally connected to the transverse slide member 102 by the pins 114. Thus, as the slide 102 is moved to the right, as Figure 4 is viewed, into the position illustrated in Figure 5, the rocker arms 105 and 106 rotate about and accordingly rotate the shaft 67 which in turn rotates the cam 65. The slide assembly composed of the elements 102 and 103 is then returned, the springs 113 permitting the rocker actuating arms 112 to move past the pins 110 and 111 and to engage the other pin on the particular rocker arm so that the cycle is repeated upon the next movement of the slide thereby again actuating the cam.

As seen in Figures 4, 5 and 6, to the other end of the slide arm 103 there is connected a further transverse member 115 to which is connected the power shaft 116, see Figure 13, which is actuated by any suitable source of power, diagrammatically indicated at 117 which may be a vacuum cylinder, air cylinder or electric solenoid, as desired. Inasmuch as any source of power which is desired may be used and which may be of commercial or preferred design, no detailed description thereof is deemed necessary. The power source 117 is controlled by the actuation of the switch 46, as previously described and as best seen on Figure 1.

As best seen in Figure 11, in order to provide lubrication to the moving parts, an oil pump is provided which may be conveniently provided by having an enlarged circumferential flange 118 which has the gear pump arm 119, which moves in the semi-annular recess 120 so that every time the cam 65 goes through a complete revolution, that is on every other shift due to the fact that the cam only moves 180° upon each shift, oil is pumped in the oil line 121 and distributed to the various moving parts as desired. Of course, any desired lubrication system may be utilized, but the illustrated oil pump is satisfactory.

The clutch is engaged and disengaged by movement of the crank arm assembly 32, as best seen in Figure 1, and this moves with the depending arm 101 of the crank arm assembly 100, as best seen in Figure 13 as the depending arm 101 is moved by the slide 102. To this end, and as seen in Figure 14, the shaft 122 is rotatably journaled in the housing 12 and which has rigidly connected or keyed thereto the depending arm 101 of the crank arm assembly 100 of Figure 13 and the crank arm 32 as illustrated in Figures 1 and 14. Thus, as best seen in in Figure 14, movement of the arm 101 by means of th slide composed of the elements 102 and 103 in turn causes movement of the clutch crank arm 32 and, through the linkage connected to the clutch throwout lever 34, the clutch is disengaged and re-engaged simultaneously with the release and relocking of the locking assembly which locks the gear plates in place and against movement. Thus, the movement of the gear selector plates and the actuation of the clutch is synchronized so that the clutch must be released before any shifting takes place and complete shifting must be accomplished before the clutch is re-engaged.

In order to insure that the clutch will be re-engaged immediately upon completion of the shifting operation, as previously mentioned, and as best seen in Figures 1 and 15, the contact arm 54 moves the movable contact of the switch 46 into engagement with the stationary contact thereby closing the switch upon actuation of the foot lever 48 or such other control as may be desired, which actuates the power source 117 to set the cycle of shifting in motion. As the crank arm 32 is moved into the position illustrated by the dotted lines in Figure 15, by means of the contact release arm 50 and connection 52, the end of the contact arm 54 is moved out behind the movable contact of the switch 46 thereby permitting the switch to release and thereby insuring that the clutch will immediately re-engage upon completion of the shifting cycle.

The lost motion connector 66 is best illustrated in Figure 12 and includes a collar 123 which is connected to the cam 65 and which has the inwardly projecting and diametrically opposed ears 124 which are engaged by the outwardly-projecting and diametrically-opposed lugs 125 keyed or otherwise rigidly secured to the shaft 67, as best seen in Figure 3. Thus, when the cam 65 passes over dead center the collar 123 continues rotating and the ears 24 move around and engage the opposite side of the ears 125 so that rotation of the cam may again take place upon the next cycle of shifting. This, of course, is in the opposite direction from that previously described.

In operation the gear shifting assembly may be connected to any transmission, such as an automobile, bus, truck or the like and, if desired, this may be accomplished by bolting the housing member 15 to the upper portion of the transmission although it may be secured thereto in other suitable ways. The various linkages to the clutch are connected, according to the particular circumstances and the arrangement of parts involved, such as illustrated in Figure 1.

When it is desired to shift from one gear to another the gear selector lever 38 is positioned where desired in advance of the actual shifting operation. It is then only necessary to actuate the lever 48 which in turn closes the contacts on the switch 46 which sets the power source 117 into motion which actuates the slide assembly 44. This causes the rocker arms 105 and 106 to be rocked as previously described, which in turn, rotates the cam 65 thereby causing the cam followers or inwardly turned ends 64 to be spread apart and thereby spread the upper ends of the gear shifters 61, 62 and 63. Depending upon the particular position in which the gear selector lever 38 is placed that particular plunger 80 will depress the spring pressed dog 72 into the notch formed by the upstanding shoulder 71 in the upper end of the particular gear shifter and, when the cam 65 has rotated through an angle of 180° the gear shifter will be returned to a retracted position and thereby cause a corresponding movement of the gear shifting plate to which that particular dog is connected. This, of course, causes a corresponding rotation of the gear shaft to which the gear plate is connected causing the gear arm connected thereto to swing which in turn moves its gear fingers causing a corresponding movement of the gears in the transmission.

Simultaneously with this movement the locking fingers 85 and 86 are moved thereby permitting the balls 87, 88 and 89 to move inwardly to permit movement of the previously described gear plates. Also, simultaneously with this movement the crank arm assembly 100 is moved by engagement of the arm 101 with the slide 102 thereby permitting the fingers 85 and 86 to move so that the previously-described release of the locking means may take place. This movement also causes simultaneous movement of the clutch crank linkage 32 causing the clutch to be disengaged and engaged at the beginning and end of the shifting cycle. In addition, the movement of the crank arm 50 causes the contact arm 54 to move out of contact with the movable contact of the switch 46 thereby permitting re-engagement of the clutch immediately upon completion of the shifting cycle.

As mentioned previously, the cylindrical rods 95 and 96 and coacting ball 97 are shifted according to the particular gear plate which is being shifted so that the others cannot move except as a unit thereby insuring against shifting of more than a single gear at one time. Further as mentioned previously the lost motion connector 66 permits a completion of movement of the cam 65 so that it is in position for the return cycle. The oil pump 119, 120 and 121 provides lubrication for the moving parts throughout every second cycle of shifting, if desired, this could be repeated for each cycle of shifting.

It is noted in connection with the rocker arms 105 and 106, as best seen in Figures 4 and 5, that the spring 109 speeds up the action in that the energy is stored in the spring as it reaches a dead center position and causes the rocker arms 105 and 106 to move rapidly to a completely reversed position with respect to the position they were in immediately beginning that cycle. They are now in position to provide a cycle in the opposite direction and, of course, store up energy and speed the cycle in that direction as well as in the one previously described.

A modification of the gear shifting assembly of the present invention is illustrated in Figures 17–28 and 47 and 48, which may either be mechanically or automatically actuated, such as by an electrical system described later herein. In this connection, it will be understood that the embodiment of the invention just previously described may also be actuated automatically as will be apparent later.

Referring now to Figures 17 through 28 and 47 and 48, corresponding parts have the same numerals and the letter "a" has been added for convenience of reference. While the embodiment previously described more particular pertains to trucks or busses having a multiple speed transmission of four or more forward speeds, or any desired number thereof, the embodiment of Figures 17 through 28 and 48 and 49 is directed primarily to use in connection with automobile transmissions which have only three forward speeds and a reverse. Thus, the shifting plates 74a and 76a, as best seen in Figure 21, are provided in the housing 12a and a pair of gear shifters 61a and 62a are provided interiorly thereof for the same purpose as mentioned in connection with the previously-described embodiment. As best seen in Figure 18, however, the cam 65a is disposed between the lower portion of the shifters and the pivoted portion about the gear shaft 55a, so that rotation of the cam 65a spreads the lower ends of the shifters throughout its cycle. The shifters are notched on their sides at 71a, as best seen in Figures 21, 24 and 25 and the dogs 72a are pivoted to move laterally with respect to the shifter plates 74a and 76a. Thus, upon actuation of the dog 72a they engage in a particular notch 71a of the particular plate 76a which is actuated for the particular gear shift and as the particular gear selector 61a or 62a moves through its complete cycle it moves the gear plate 74a or 76a and rotates the particular gear shaft to which it is connected, which in turn swings the gear arm connected thereto causing a movement of the corresponding gear finger and corresponding gear. This movement can best be seen by comparison of Figures 21, 24 and 25.

In Figure 21, the gear shifters and shift plates are in a neutral position. In Figure 24 a preselection has been made with respect to the particular gear actuated by the dog 72a at the lower right hand side of the drawing so that the dog is engaged in the notch 71a of the lowermost gear plate 76a. When the gear shifter is in a fully retracted position at the end of its stroke, since the dog 72a is hinged to the lowermost gear plate 76a, it is thereby moved to the position illustrated in Figure 25 which thereby rotates the shaft to which that particular gear plate 76a is connected. While it may be desirable in some instances to actuate the gears through the same arrangement of parts as described in connection with the first described embodiment, preferably, boss or ear 126, see Figure 18, is provided at the lower end of the gear plate which engages the slide 127 slidably disposed on the slide ways 128 secured to the underside of the housing 12a by means of the supports 129, the gear finger 22 being connected in this case to the lower portion of the slide 127 for moving the respective gears into and out of engagement with one another. Thus, for automobiles, it is unnecessary to provide the coaxially disposed shafts and accompanying linkage to obtain the necessary movement of the gear fingers 22.

For use in connection with automobiles, the locking assembly may be completely omitted; however, as best seen in Figure 20 it is desirable to provide a cylindrical rod 95a to prevent inadvertent actuation of more than one gear into engagement at one time. This functions the same as in the previously described embodiment of the invention and no further description thereof is deemed necessary.

It will be understood that the modified embodiment of Figures 17 through 28 and 48 and 49 may be substituted for the corresponding parts for the embodiment described in connection with Figures 1–16 with the remainder of the elements set forth therein. Thus, the shifting operation may take place as previously described.

In connection with gear shifting assemblies for automobiles, however, it is unnecessary to provide a number of things which are required in the application of a shifting assembly to trucks. For example, it is unnecessary to have the locking device, the multiple forward speeds and the fast shift to preserve momentum of the truck or bus or other heavy equipment to which it may be applied. Thus, the gear shifting assembly may be greatly simplified as applied to transmissions for automobiles. For example, as best seen in Figure 17, the power connection 116a is connected to the crank arm 103a to which the cam 102a is connected. A follower cam arm 101a is connected to the shaft 122a to the other end of which is connected the crank arm 32a which in turn is connected to the clutch throwout lever for disengaging and engaging the clutch. A pin 130 is provided on the crank arm 103a and it engages the stop shoulder 131 on the collar 132 which is keyed or otherwise rigidly secured to the shaft 67a to which the cam 65a is rigidly secured. Thus, upon initial actuation of the arm 103a, the cam 65a will not be moved until such time as the follower arm 101a causes disengagement of the clutch, as previously described, at which time the pin 130 engages the stop shoulder 131 on the collar 132 thereby causing a movement of the cam 65a and causing a shift of gears as previously described. This action is best illustrated in Figure 22 where the clutch has been released and the pin 130 has just come into contact with the shoulder 131. As shown in Figure 23 the gears are then cocked preparatory to shifting, such as shown in Figure 24. The power source is then permitted to recede which causes a reverse movement of the crank arm 103 which first moves the arm 103a until the pin 130 engages the stop shoulder 133, moving the cam off dead center whereupon the springs 69a cause the gear shifters to move rapidly back to their initial position prior to re-engagement of the clutch due to the arm 103 returning to the position illustrated in Figure 17. The dead center position is best illustrated in Figure 26, and the cam 67a must be moved off this position before the clutch is re-engaged.

Referring now to Figure 28 a suitable power source, such as the vacuum chamber 117a, is illustrated and, in order to provide a smooth re-engagement of the clutch, means are included to cushion the latter part of the stroke for engaging the clutch. Turning now to this figure a vacuum chamber 117a is provided which has the piston 134 secured to the piston rod 135 which forms a continuation of the linkage 116a. It is noted that the piston 134 is apertured at its central portion and slidably fits about the shaft 136 so that during the stroke, the piston moves from one end of the vacuum chamber 117a to the other about the shaft 136 and the piston rod 135 is telescoped about the shaft in its movement. A port 137 is provided at the end of the vacuum chamber 117a to permit the inflow of air and this port should be so positioned that it is proximate the piston 134 at the end of the stroke, that is, when the clutch is in engaged position.

The shaft 136 is apertured at 138 and is provided therefrom with a passage 139 which is connected to the pipe 140, which in turn is connected to the free air inlet 141 through the check valve 142. A leg 143 of the pipe 140 is connected to the channel 144 provided in the body 145 of the vacuum valve and the other end of the channel 144 is connected to a vacuum line which in turn is connected to any suitable source of vacuum, for example, the intake manifold of the automobile motor to which the gear shifting assembly is applied.

A pair of pipes 146 and 147 are also connected to the end of the vacuum chamber 117a and are connected to the channels 148 and 149, respectively, which in turn are connected to the lines 150 and 145, respectively, to permit free air to flow into the vacuum chamber and to provide a vacuum pull on the chamber, respectively.

It is noted that the three channels 144, 148 and 149 are generally parallel with respect to one another and disposed across these channels are a pair of slide valves 151 and 152 for opening and closing the channels. Thus, the slide valve 151 is provided with the transverse passages 153 and 154 which are moved into and out of registry with the channels 144 and 148 upon movement of the slide valve 151. As seen in Figure 28, the slide valve 151 is in position so that the passage 154 therethrough is in registry with the channel 148 so that free air may be admitted to the interior of the vacuum cylinder 117a, as will be explained later. By sliding movement of the slide valve 151, the passage 154 is moved out of registry with the channel 148 and the passage 153 is moved into registry with the passage 144 for a purpose to be described.

Similarly, the slide valve 152 is provided with three passages 155, 156 and 157 for moving into and out of registry with the channels 144, 148 and 149. Thus, when the slide valve 152 is in the position illustrated in Figure 28, the channels 144 and 148 are opened through this slide valve and the channel 149 is closed. Movement of the slide valve in the direction of the arrows moves the passages 155 and 156 out of registry with the channels 144 and 148, respectively, and the passage 157 into registry with the channel 149 thereby permitting a vacuum to be applied to the inner end of the vacuum chamber 117a for moving the piston 134 and at the same time shutting off flow of free air through the channel 148 and any vacuum pull through the aperture or port 138.

In operation, when a gear is to be shifted the slide valve 152 will be moved by means to be described later in the direction of the arrow thereby moving the passage 157 into registry with the channel 149 and moving the passages 155 and 156 out of registry with the channels 144 and 148. This serves the purpose of providing a vacuum pull by means of the vacuum line 145 on the end of the vacuum chamber 117a to move the piston 134 to the right hand side of the vacuum chamber 117a, as the drawing is viewed. This also cuts off the supply of free air to this end of the vacuum chamber 117a through the channel 148 and connecting pipe 146. It is noted, however, that air is permitted to enter the left hand side of the vacuum chamber 117a through the port 137 and once the piston 134 has passed the central position illustrated in dotted lines, air flows through the port 138, passageway 139, pipe 140 through the check valve 142 and free air inlet 141 into the line 150 so that it is available to flow into the left hand side of the vacuum chamber 117a through the channel 148 and pipe 146 when the slide valve 152 is moved back into the position illustrated in Figure 28. Once this movement occurs, the vacuum pull through pipe 147 and channel 149 is broken due to the fact that the passage 157 of the slide valve 152 moves out of registry and free air enters the left hand side of the vacuum chamber 117a through the pipe 146, as previously described, thereby rapidly moving the piston 134 to the central position illustrated in dotted lines. Once this position is reached, however, air can no longer enter the port 138 but free air entering the free air inlet 141 through line 150 provides the continuing force for completely moving the piston 134 to the left hand side but this movement is cushioned due to this effect so that there is a smooth re-engagement of the clutch. It is noted that the free air inlet 141 is provided with an adjusting nut 158 for the purpose of adjusting the amount of free air permitted to flow into the free air inlet 141 for determining the speed at which the clutch is re-engaged.

The slide valve 151 is actuated only when it is desired to release the clutch without shifting gears. Thus, upon movement of the slide valve 151 in the direction of the arrows, the passage 154 is moved out of registry with the channel 148 thereby shutting off free air into the right hand side of the vacuum chamber 117a and moves the passage 153 into registry with the channel 154. Inasmuch as the passage 155 in the slide valve 152 is already in registry with the channel 144 this permits vacuum to be applied by the vacuum line 145 through the channel 144, pipe leg 143, pipe 140, passage 139 and port 138 in the shaft 136 to the interior of the vacuum chamber 117a thereby causing a movement of the piston 134 to the position illustrated in dotted lines in Figure 28, such being the central position. This, of course, closes the port 138 so that no additional vacuum can be applied so that the piston 134 does not move completely over to the right hand side of the vacuum chamber 117a which is the movement, that is the movement of the central position to the right hand position which actuates the gear shifters.

When it is desired to re-engage the clutch, the slide valve 151 is moved back to the position illustrated in Figure 28 which moves the passage 153 therein out of registry with the channel 144 thereby breaking the vacuum pull and bringing the passage 154 into registry with the channel 148 thereby permitting free air entering through the adjustable nut 148 and the free air inlet 141 and line 150 to enter the right hand side of the vacuum chamber 117a thereby causing movement of the piston 134 to the left hand side of the vacuum chamber 117a for re-engaging the clutch.

As is the case in connection with the example of the invention first described, return to neutral pins 43 are provided which coact with the sides 45a of the gear shift plates as previously described. This action, however, is best illustrated by turning to Figures 18, 26 and 27. In Figure 18, the particular gear shift plate illustrated is in a neutral position and the pins 43a do not engage either of the sides 45a as the gear shifter to which these pins are connected is in a retracted position. Figure 26 illustrates the gear shifter in expanded position and shows the pins 43a engaging each of the sides 45a of that particular gear shift plate. When a plate has been shifted, a side 45a will engage a pin 43a when the gear shifter is in retracted position, as best seen in Figure 27. Thus, upon expansion of the gear shifter as illustrated in Figure 26, the gear shift plate will be moved to that position by means of the pin 43a engaging the side 45a. When the gear shifter has completed its particular cycle and is in retracted position, the various parts will be in the position illustrated in Figure 18.

Thus, upon each shifting of the gear shift plate to an engaged gear position the pins 43a move this gear plate back to neutral position upon subsequent shifting of the gear plates.

Turning now to Figure 29 there is illustrated an electric control means for either manual selection of gears or automatic selection of the forward speed gears, as desired. Turning now to this figure the ignition switch is indicated by the numeral 160 and upon closing this switch it actuates the power relay 161 thereby closing the circuit through the battery 162 of the automobile to ground.

What might be termed a manual control switch or panel is generally indicated by the reference numeral 163 and there is also provided an automatic forward speed switch or control panel generally indicated by the numeral 164 which, in general, upon actuation, close respective circuits to the solenoids 167 actuating the gear shifter plungers 180a which in turn move the dogs to engage the gear plates disposed within the housing 12a. In general, the slide valves 151 and 152 of the vacuum switch 145 are actuated by the solenoids 165 and 166, respectively, and the respective gear shift plungers 80a are actuated by the solenoids 167. While four solenoids 167 are illustrated, there will be a solenoid for each particular gear and inasmuch as the presently described gear shifting mechanism is applied to a conventional automobile transmission, three forward speeds and one reverse are all that is necessary.

The manual control panel 163 includes a plurality of contacts, the upper group of which are for the purpose of closing the circuits to the solenoids actuating the slide valves in the vacuum valve 145 and the lower group is for the purpose of closing the circuits actuating the particular solenoids 167 for making the desired gear selection and also for the purpose of switching on the automatic control, when desired. While a pair of movable switch contacts 168a and 168b are illustrated, in practice, this will be a double pole switch so that the contacts of the vacuum cylinder control and gear selector control are simultaneously moved into and out of engagement with the respective contacts thereof.

In the panel 163, the first contact on the left hand side is the low gear contact and reading clockwise the second contact is second gear, the third high gear, the fourth contact is not included in the vacuum cylinder control but is the contact to the automatic control, the fifth one is the neutral position and it is noted that none is needed in connection with the gear selector switch and the last one is reverse for both switches. The movable contact 168 is moved manually so that the control may be placed upon automatic drive in a forward speed or particular gears may be selected manually in the usual manner.

The automatic switch 164 has a movable contact member 169, which is illustrated as two movable contact members 169a and 169b for automatic movement to engage the respective contacts illustrated. The upper group of contacts are the vacuum cylinder control contacts and the lower group of contacts are the gear selector contacts and, reading clockwise beginning at the left hand side the first contact is for low gear, the second is for second gear and the last is for high gear. Thus, movement of the contact arms 169a and 169b automatically closes the circuits to the respective solenoids shifting a particular gear plate from low to second to high gear and at the same time actuates the vacuum valve 145 so that the clutch is disengaged and re-engaged, as previously described, as well as actuating the shifting mechanism such as cam 65a as previously mentioned.

In each of the electric lines extending from each of the gear selector contacts there are provided a circuit breaker 170, which circuit breakers are normally closed, except the circuit breaker is open in that circuit in which the particular gear shifter plate is in an engaged gear position so that every time the foot control means is released, thereby closing the circuit, the clutch will not be disengaged. This also prevents the gear plate from being shifted into a neutral position and being re-shifted into an engaged gear position when it is necessary to release the foot throttle and control, such as when applying the brake.

As a refinement, a manually-actuated, free wheeling switch 171 is provided so that when this switch is closed, it actuates the vacuum control switch 145 moving the piston 134 to the central position thereby disengaging the clutch and providing free wheeling. Of course, upon release of this control, the clutch is re-engaged as the circuit is broken energizing that particular solenoid 165.

There is also provided an automatic clutch switch 172 for the purpose of disengaging the clutch when the speed of the automobile is lower than a predetermined minimum, say below ten miles an hour. Thus, when the speed of an automobile drops to less than ten miles per hour, the movable contact 172, which is part of the automatic switch system, is moved to closed position, as illustrated in Figure 29, thereby energizing the solenoid 165 of the vacuum control valve 145 thereby disengaging the clutch, as previously described. Normally, at speeds in excess of ten miles per hour or a predetermined minimum, the movable contact member 172 is in an open position.

Referring now to the foot control, the foot throttle is indicated by the numeral 173 and closely adjacent to the foot throttle is what might be termed a shift control pedal 174 which, when it is released, extends upwardly beyond the upper end of the foot throttle. Rigidly connected to the shift control pedal 174 is a transverse contact member 175 which is slidable about the shaft 176 of the foot throttle. Thus, when the foot throttle is released but the shift control is not released, the transverse contact member 175 will not engage the pivoted arm 177 which engages and moves the movable contact member 178 for closing the power circuit. Upon complete release, however, the shift control pedal will move upwardly to a point to where the transverse contact member 175 engages the pivoted contact member 177 thereby moving the movable contact member 178 and closing the circuit. This applies power to the solenoids so that when the respective circuits connected thereto are similarly closed, these are energized as previously described. The particular foot control means may be varied, of course, from that shown, but the described and illustrated control is advantageous as it prevents inadvertent application of power to the solenoids when the foot throttle is momentarily released and there is no desire to shift or disengage the clutch.

The action of the foot throttle and foot control may best be seen by referring to Figures 30, 31 and 32. Figure 30 shows both the foot throttle 173 and shift control 174 in fully released position showing the transverse contact member 175 engaging the movable contact 177 for closing the contact 178. Figure 31 illustrates both the foot throttle and shift control in a depressed position in which event the contact arm 177 is not actuated and the power circuit is open. Figure 2 illustrates the foot throttle 173 fully released but it is noted that the shift control while it has engaged the movable arm 177 has not moved it into the position illustrated in Figure 30 thereby leaving the power circuit open and preventing any inadvertent disengagement of the clutch or shifting of the gears.

Referring now to Figures 33 to 36, inclusive, a manual control switch is illustrated and it is noted that the movable contacts 168a and 168b have spring loaded contact members 179a and 179b to engage the respective vacuum control contacts, as illustrated in Figure 36, and gear selection contacts, as illustrated in Figure 35. The movable contact arms 168a and 168a are rotated by means of the control lever arm 180 which is connected to the shaft 181 rotatably journaled in the control switch 163 to which the movable contact members 168a and 168b are rigidly connected.

In order to releasably lock the movable contacts in a particular position, a detent arrangement is provided which includes the spring pressed ball 182 which is engaged in the series of hemispherical recesses 183 provided in a side of the housing for the control switch so that a good contact is made with the contact members 179a and 179b with the respective contact to which it is moved. Obviously, any suitable detent arrangement may be utilized for this purpose.

Thus, by merely moving the control lever arm 180 the movable contacts 168a and 168b are moved into engagement with the particularly selected contact for gear selection and for disengaging the clutch.

In the event it is desired to provide automatic shifting in forward speeds, reference is made to Figures 37-43. Turning now to these figures, the automatic switch 164 has the movable contact element 169, which as mentioned previously, comprises in effect the two movable contact elements 169a and 169b which move as a unit and are illustrated in Figure 29. As is the case in connection with the manual switch illustrated in Figures 33 through 36, the movable contact elements 169 and 172 for actuating the automatic clutch switch are spring pressed to engage the various contact elements for energizing the various circuits. Thus, as best seen in Figure 39, when the manual switch is turned to automatic the movable contact element 169 engages the elongated contact illustrated in Figure 39 through its entire course of forward movement so that the automatic circuit is closed to ground through the switch 168a. Thus, when in a low gear position, as illustrated in Figures 39-43, the movable contact element engages the low gear selector contact and vacuum cylinder contact for releasing the clutch, as illustrated in Figures 40 and 41 and the movable contact 172 engages the stationary contact closing that circuit to ground for automatic release of the clutch when the speed of the automobile is less than a predetermined minimum, such as ten miles per hour. Also, it is noted in connection with Figure 43 that throughout the entire stroke this contact grounds this particular contact to ground, as best seen in Figure 29.

The movable contacts 169 and 172 are rotatably journaled within the automatic control housing 164 and are connected to and actuated by the shaft 184 which is connected to the crank arm 185 which, as best seen in Figure 37, in turn is connected to the diaphragm arm 186 connected to the diaphragm 187 which in turn is connected in the housing 188 of a motor actuated by oil pressure through the line 189. A spring 190 is provided which yieldingly maintains the diaphragm 187 in the position illustrated in Figure 37, which maintains the movable contacts in low gear position as illustrated in Figures 38-43, inclusive, but the pressure of the oil in line 189 in response to the speed of the automobile drive shaft increases the pressure against the diaphragm 187 thereby overcoming the force of the spring 190 and moving the movable contacts 169 and 170 throughout their cycle, for example, clockwise from left to right from low, to second gear to high. Thus, this causes an actuation of the movable contact members 169 and 172 and causes them to engage the previously-mentioned contacts which thereby close the circuits to the particular solenoids for energizing that particular gear and to the vacuum valve 145 for releasing and re-engaging the clutch, all as previously described. Of course, the reverse operation takes place as the speed of the drive shaft is decreased, which causes a lessening or decrease in pressure of oil in the conduit 189 and thus permits the diaphragm 187 to move to the left, as viewed in Figure 7, under the action of the spring 190 thereby causing a rotation of the shaft 184 which shifts the gears as previously mentioned.

Referring now to Figures 44-46, inclusive, the action of the circuit breakers 170 to break the circuit to the gear selectors and the circuit breakers 170' to break the circuits to the vacuum control 145 are illustrated. As seen in Figure 44, the circuit breakers 170 and 170' are normally in closed position and may conveniently be connected to the housing 12a adjacent an outer end of each gear plate 76a. A movable plunger 191 extends through the case 12a and is located adjacent the outer end of the gear plate 76a when it is in a neutral position. Thus, upon movement of the gear plate 76a the plunger 191 is contacted and moves upwardly thereby moving the movable contacts of the circuit breakers 170 and 170' out of engagement with the stationary contact thereof thereby breaking the circuit. As best seen in Figure 45 each of the movable contacts is connected by a leaf spring 192 to a suitable anchor 193 so that on upward movement of the plunger 191 the movable contacts may be moved upwardly, but upon release of the plunger 191 by movement of retraction of the gear plate 76a, the spring 192 moves the plunger 191 inwardly and again brings the movable contact into engagement with the stationary contact. As mentioned previously there is a circuit breaker provided for each gear selector and corresponding vacuum control movement so that when a particular gear plate is in engaged gear position the circuit breakers for those particular circuits are open thereby preventing inadvertent release of the clutch and shifting of the gear into neutral and back into engaged gear position when the foot throttle 173 and foot control 174 are momentarily or inadvertently released.

It is thought that the operation of the automatic shifting system is clear from the description thereof; however, in operation the automatic shifting device of Figures 17 through 48 is installed upon a conventional automobile transmission and the ears of projections 162 on each gear plate engages the slide 127 which has the gear fingers 22 for engaging and disengaging the particular gears. Assuming that automatic forward speed is to be selected, the control selector lever 180 is moved to automatic position. Thus, upon depressing the foot throttle and shift control member 173 and 174, the gear selector plate for low gear is shifted into an engaged gear position in view of the fact that the movable contacts 169 and 172 are in the positions illustrated in Figures 39-43. At this time the particular circuit breakers 170 and 175 are broken thereby preventing inadvertent release of the clutch or shifting of the low gear plate out of engaged gear position and back into this engaged gear position upon momentary release of the foot throttle and shift control 173 and 174. As the speed of the automobile is increased, the speed of the drive shaft is similarly increased which increases the oil pressure in the line 189 and actuates the diaphragm 187 thereby energizing the automatic switch 164, as previously described. Thus, automatic shifting takes place in the three forward speeds.

If manual shifting is desired, the control shift lever 180 may be moved to any desired position other than automatic which closes the particular circuit to the solenoid actuating the dog for that particular gear shift plate and also for the solenoid controlling the vacuum control valve 145.

Thus, completely automatic or manual control is possible with the arrangement illustrated. Also, the clutch is automatically disengaged when a predetermined minimum R. P. M. of the driving shaft is obtained by engagement of the movable contact 172 thereby actuating the solenoid 165 for disengaging the clutch, as previously described.

While the particular automatic control system has been described in connection with the embodiment illustrated in Figures 17-27 and 47 and 48, it will be understood that this automatic control may be applied to the embodiment illustrated in Figures 1-16, the solenoids taking the place of the plungers 80 which are moved manually by the gear shift control lever 38. Also, the vacuum control arrangement may be applied to the first-described embodiment; however, momentum is lost due to the relatively slow disengagement of the clutch when this is substituted for the rocker arm assembly which is actuated relatively rapidly to complete its rocker movement for rapid re-engagement of the clutch for the purpose of preserving the momentum of the truck, bus or other vehicle to which it is applied.

It is noted in connection with the cam 65 illustrated in Figure 3 and the cam 65a illustrated in Figure 48 in connection with the second described embodiment, that for the different gear selectors these are moved different distances due to the fact that the gears in the transmission are moved different distances in engaging and disengaging them. Obviously, any suitable configuration of the cam for movement of the appropriate distance may be made for a particular arrangement of gears in a particular transmission.

It is therefore apparent that numerous changes in detail and rearrangement of parts may be made within the scope of the present invention. Also, that the present invention is well suited to carry out the objects and ends and has the advantages mentioned as well as others inherent therein. Accordingly the present invention is not to be limited by the specific details of the several examples given for the purpose of disclosure, but is to be limited only by the spirit of the invention as defined by the scope of the appended claims.

What is claimed is:

1. A gear shifting mechanism comprising, a frame, a plurality of gear shifters movably mounted in the frame, a cam engaging each gear shifter, rotation of the cam moving said gear shifters, means maintaining the gear shifters in engagement with the cam, a plurality of gear shifter plates movably mounted in the frame, at least one gear shifter plate mounted adjacent at least one each of said gear shifters, linkage connecting each gear shifter plate to a gear to be shifted, engageable elements movably mounted on each gear shifter and on an adjacent gear shifter plate, gear selector means in reach of the operator selectively actuating said elements into engagement, means for rotating said cam, a clutch operatively associated with the gear shifting mechanism, and means for disengaging the clutch substantially simultaneously with initial movement of the cam and re-engaging the clutch after movement of the selected gear shifter plate.

2. A gear shifting device comprising, a housing, a shaft mounted in the housing, a plurality of gear shifters rotatably mounted on the shaft, a cam engaging each gear shifter, rotation of the cam moving said gear shifter, means maintaining the gear shifters in engagement with the cam, a plurality of gear shifter plates rotatably mounted on the shaft, one gear shifter plate mounted adjacent at least one of said gear shifters, linkage connecting each gear shifter plate to a gear to be shifted, engageable elements movably mounted on each gear shifter and on an adjacent gear shifter plate, gear selector means in reach of the operator selectively actuating said elements into engagement, means for rotating said cam, a clutch operatively associated with the gear shifting mechanism, and means for disengaging the clutch substantially simultaneously with initial movement of the cam and re-engaging the clutch after movement of the selected gear shifter plate.

3. A gear shifting device comprising, a housing, a shaft mounted in the housing, a plurality of gear shifters, each gear shifter being comprised of a pair of members rotatably mounted on the shaft and being expansible and retractable with respect to one another, a cam disposed interiorly of each pair of members and engaging said members, rotation of the cam expanding and retracting said members, means yieldingly biasing each of said members toward said cam, a plurality of gear shifter plates rotatably mounted on the shaft, one gear shifter plate being mounted adjacent each pair of members, linkage connecting each gear shifter plate to a gear to be shifted, engageable elements movably mounted on each member and on an adjacent gear shifter plate, gear selector means in reach of the operator selectively actuating said elements into engagement, means for rotating said cam, a clutch operatively associated with the gear shifting mechanism, and means for disengaging the clutch substantially simultaneously with initial movement of the cam and re-engaging the clutch after movement of the selected gear shifter plate.

4. A gear shifting mechanism comprising a housing, a shaft mounted in the housing, a plurality of gear shifters, each of said gear shifters comprising a pair of members rotatably mounted on said shaft and having their ends projecting beyond the shaft and substantially in the same plane, a cam engaging one end of each pair of members, rotation of the cam expanding said one end of each pair of members, spring means yieldingly biasing said end of each pair of members toward said cam, a plurality of gear shifter plates, one each of said gear shifting plates being rotatably mounted on said shaft adjacent each pair of members and in parallel relationship thereto, engageable means on each gear shifter plate and each member movable into and out of engagement for effecting movement of a gear selector plate on retraction of said pair of members, gear selector means in reach of the operator engageable with said engageable means for selectively moving said engageable means into engagement with a selected gear plate, linkage connecting each gear plate to a gear to be shifted, means for rotating said cam, a clutch operatively associated with the gear shifting mechanism, and means for disengaging the clutch substantially simultaneously with initial movement of the cam and reengaging the clutch after movement of the selected gear shifter plate.

5. The gear shifting mechanism of claim 4 where the linkage connecting each gear plate to a gear to be shifted comprises a plurality of coaxial shafts rotatably mounted on said first-mentioned shaft, one each of said coaxial shafts being connected to one each of said gear shifter plates, and an arm connected proximate the extremity of each of said coaxial shafts engageable with said gear to be shifted whereupon rotation of a selected gear plate rotates the coaxial shaft connected thereto and the arm connected to the last-mentioned coaxial shaft thereby shifting the selected gear.

6. The gear shifting mechanism of claim 4 where the gear selector means includes a plurality of spring-pressed plungers yieldingly movable into engagement with one each of the engageable elements and a gear selector lever selectively engageable with said plungers.

7. The gear shifting mechanism of claim 4 where the means for rotating the cam includes a second shaft rotatably journaled in the housing, said cam being mounted on said second shaft, a third shaft, a lost motion connector connecting the third shaft to the second shaft, a pair of arms, one of said arms rigidly connected to said third shaft and the other rotatably connected thereto, a spring connected to adjacent free ends of said arms and biasing said arms toward one another, a slide, engageable means on the slide and on at least one of the arms whereby sliding movement of the slide engages said engageable means and expands said arms and moves them into diametrically opposite positions thereby rotating said cam.

8. The gear shifting mechanism of claim 4 including releasable locking means engaging each gear shifter plate and said gear selector for locking the gear plates in shifted position, and detent means engaging said gear shifters, gear plates and housing so constructed and arranged that only the selected gear plate is released for movement during a shifting cycle.

9. A gear shifting mechanism comprising, a housing, a shaft mounted in the housing, a plurality of gear shifters, each of said gear shifters comprising a pair of members rotatably mounted on the shaft and being expansible and contractable relative to one another, a cam disposed in the housing engaging each pair of members, rotation of the cam expanding and contracting each of said pair of members, means yieldingly biasing each member of said pairs of members toward said cam, a plurality of gear shifter plates, one each of said gear shifter plates rotatably mounted on said shaft adjacent each pair of members and in parallel relationship thereto, engageable means on each member of said gear shifters and on said gear shifter plates movable into and out of engagement for effecting movement of a gear shifter plate on retraction of said pair of members, gear selector means in reach of the operator for actuating said engageable means into engagement with a selected gear shifter plate, each said gear plate including a projection for engaging linkage for actuating a gear to be shifted, means for rotating said cam, a clutch operatively associated with the gear shifting mechanism, and means for disengaging the clutch substantially simultaneously with initial movement of the cam and re-engaging the clutch after movement of the selected gear shifter plate.

10. The gear shifting mechanism of claim 9 where the means for rotating the cam includes a crank arm, a lost motion connector rigidly connected to the cam, engageable means on the crank arm and the lost motion connector engageable after initial movement of the crank arm and disengageable before final return of the crank arm to initial position, and linkage connecting the clutch with the crank arm whereby on initial movement of the crank arm the clutch is disengaged prior to actuation of the cam for shifting the gear and the stroke of the cam is completed prior to return of the crank arm to said initial position thereby completing the gear shifting cycle before re-engaging the clutch.

11. The gear shifting mechanism of claim 10 where the means for rotating the cam and actuating the clutch includes a cylinder, a shaft disposed axially in the cylinder, a piston in the cylinder slidable about the shaft, linkage connecting the piston and crank arm, movement of the piston moving the crank arm, a fluid inlet at one end of the cylinder, a plurality of fluid inlets at the other end of the cylinder, said shaft having a fluid passage opening into the cylinder at a point in the stroke of the cylinder before engagement of the engageable means on the crank and lost motion connector, a slide valve provided with a pair of channels, conduits connecting the channels with the other of the plurality of inlets in the cylinder, and slides slidingly disposed across said channels, said slide valve and slides being so constructed and arranged that movement of one of said slides effects movement of said piston to said point in said cylinder for releasing the clutch and actuation of said other slide effects movement of said piston throughout said stroke in said cylinder for releasing the clutch and actuating the lost motion connector thereby actuating the cam.

12. A gear shifting mechanism comprising, a housing, a plurality of gear shifters movably mounted in the housing, a cam engaging each gear shifter, rotation of the cam moving said gear shifters, means maintaining the shifters in engagement with the cam, a plurality of gear shifter plates, one each of said gear shifter plates being movably mounted adjacent at least one gear shifter, engageable means on each gear shifter and gear shifter plate movable into engagement whereby on engagement of said engageable means a selected gear plate is moved upon movement of said gear shifter, gear selector means in reach of the operator for actuating said engageable means into engagement with a selected gear shifter plate, linkage connecting each gear shifter plate with a gear to be shifted, a clutch operatively associated with the gear shifting mechanism, means for disengaging and re-engaging the clutch during shifting and control means for rotating said cam and actuating said engageable means comprising a solenoid associated with each engageable means and said clutch disengaging and re-engaging means for actuating the same, a separate electric circuit connected to each solenoid, said circuits having a common lead, a double throw switch actuated by movement of the gear selector means and an electric contact connected to each electric circuit whereby movement of said gear selector means engages the double throw switch with the contact of a selected circuit thereby closing the circuit to the solenoid connected to the clutch disengaging and reengaging means and closing the circuit to the selected solenoid for moving the engageable means connected thereto, a foot pedal, and a normally open contact in the common lead of the circuits movable to closed position in response to depressing of the foot throttle.

13. The gear shifting mechanism of claim 12 including automatic means for energizing said solenoids in response to predetermined R. P. M. including a switch having a plurality of pairs of contacts, one each of said pairs connected to the circuits of the solenoids energizing forward speed gears and the clutch engaging and disengaging means, a pair of movable contacts engageable with the first-mentioned contacts, a crank arm connected to the movable contacts for moving the same, and a fluid pump connected to the crank arm, said fluid pump being responsive to R. P. M. of the drive shaft whereby upon increased R. P. M. of the drive shaft said movable contacts are moved into sequential contact with said first-mentioned contacts thereby shifting said forward speed gears.

References Cited in the file of this patent

UNITED STATES PATENTS

| | | |
|---|---|---|
| 1,273,266 | Patch | July 23, 1918 |
| 1,648,027 | Pulliam | Nov. 8, 1927 |
| 1,662,164 | Pratt | Mar. 13, 1928 |
| 2,434,051 | Randol | Jan. 6, 1948 |
| 2,539,589 | Pacas | Jan. 30, 1951 |